United States Patent
Wijnands et al.

(10) Patent No.: US 10,764,076 B2
(45) Date of Patent: *Sep. 1, 2020

(54) BIT INDEXED EXPLICIT REPLICATION FOR LAYER 2 NETWORKING

(71) Applicant: Cisco Technology, Inc., San Jose, CA (US)

(72) Inventors: Ijsbrand Wijnands, Leuven (BE); Gregory J. Shepherd, Eugene, OR (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,575

(22) Filed: Dec. 31, 2018

(65) Prior Publication Data

US 2019/0215176 A1    Jul. 11, 2019

Related U.S. Application Data

(63) Continuation of application No. 14/536,153, filed on Nov. 7, 2014, now Pat. No. 10,218,524, which is a
(Continued)

(51) Int. Cl.
*H04L 12/18* (2006.01)
*H04L 12/741* (2013.01)
(Continued)

(52) U.S. Cl.
CPC .......... *H04L 12/1886* (2013.01); *H04L 12/18* (2013.01); *H04L 45/16* (2013.01);
(Continued)

(58) Field of Classification Search
None
See application file for complete search history.

(56) References Cited

U.S. PATENT DOCUMENTS

| 5,088,091 A | 2/1992 | Schroeder |
| 5,138,615 A | 8/1992 | Lamport |

(Continued)

FOREIGN PATENT DOCUMENTS

| CN | 1754353 | 3/2006 |
| CN | 1792065 | 6/2006 |

(Continued)

OTHER PUBLICATIONS

Eckert, Toerless et al., "Traffic Engineering for Bit Indexed Explicit Replication"; U.S. Appl. No. 16/457,339, filed Jun. 28, 2019; consisting of Specification, Claims, Abstract, and Drawings (88 pages).

(Continued)

*Primary Examiner* — Gregory B Sefcheck
*Assistant Examiner* — Amar Persaud
(74) *Attorney, Agent, or Firm* — Campbell Stephenson LLP

(57) ABSTRACT

Functionality for creating a bit routing table for use in a bit-indexed explicit replication ("BIER") environment in disclosed herein. In one embodiment, this functionality includes receiving information from a host, and determining whether the information comprises a MAC address that is a bit-indexed explicit replication ("BIER") MAC address. In response to determining that the information comprises a BIER MAC address, this functionality creates an entry corresponding to the MAC address in a bit routing table. This functionality also analyzes the information to determine a bit position that is associated with the host, and also determines a port via which the host is reachable. The functionality updates the bit routing table by storing information identifying the bit position and the port in the entry, such that the bit position and the port both correspond to the
(Continued)

MAC address. This functionality can be used to route packets in a BIER environment.

20 Claims, 15 Drawing Sheets

Related U.S. Application Data continuation-in-part of application No. 14/888,810, filed on Sep. 17, 2014, now Pat. No. 9,942,053, and a continuation-in-part of application No. 14/488,790, filed on Sep. 17, 2014, now Pat. No. 10,225,090, and a continuation-in-part of application No. 14/488,761, filed on Sep. 17, 2014, now Pat. No. 9,853,822.

(60) Provisional application No. 61/931,473, filed on Jan. 24, 2014, provisional application No. 61/878,693, filed on Sep. 17, 2013.

(51) Int. Cl.
*H04L 12/761* (2013.01)
*H04L 12/721* (2013.01)
*H04L 12/723* (2013.01)

(52) U.S. Cl.
CPC .............. *H04L 45/66* (2013.01); *H04L 45/74* (2013.01); *H04L 45/50* (2013.01)

(56) References Cited

U.S. PATENT DOCUMENTS

| | | | |
|---|---|---|---|
| 5,764,624 A | 6/1998 | Endo | |
| 5,999,531 A | 12/1999 | Ferolito | |
| 6,130,881 A | 10/2000 | Stiller | |
| 6,147,976 A | 11/2000 | Shand | |
| 6,148,000 A | 11/2000 | Feldman | |
| 6,240,188 B1 | 5/2001 | Dondeti | |
| 6,615,336 B1 | 9/2003 | Chen | |
| 6,771,673 B1 | 8/2004 | Baum | |
| 6,778,532 B1 | 8/2004 | Akahane | |
| 6,873,627 B1 | 3/2005 | Miller | |
| 7,111,101 B1 | 9/2006 | Bourke | |
| 7,281,085 B1 | 10/2007 | Garg | |
| 7,519,733 B1 | 4/2009 | Thubert | |
| 7,551,599 B2 | 6/2009 | Levit | |
| 7,925,778 B1 | 4/2011 | Wijnands | |
| 8,320,374 B2 | 11/2012 | de Heer | |
| 8,325,726 B2 | 12/2012 | Baban et al. | |
| 8,670,146 B1 | 3/2014 | Van Couvering | |
| 8,774,179 B1 | 7/2014 | Gaggara | |
| 8,787,400 B1 | 7/2014 | Barth | |
| 8,830,826 B2 | 9/2014 | Chen | |
| 8,848,728 B1 | 9/2014 | Revah | |
| 8,880,869 B1 | 11/2014 | Shah | |
| 8,890,903 B2 | 11/2014 | Russell | |
| 8,942,256 B1 | 1/2015 | Barth | |
| 9,065,766 B2 | 6/2015 | Matsuoka | |
| 9,455,918 B1 | 9/2016 | Revah | |
| 2002/0126661 A1 | 9/2002 | Ngai | |
| 2002/0191628 A1 | 12/2002 | Liu | |
| 2003/0043802 A1 | 3/2003 | Yazaki | |
| 2003/0048779 A1 | 3/2003 | Doherty | |
| 2003/0088696 A1 | 5/2003 | McCanne | |
| 2003/0142685 A1 | 7/2003 | Bare | |
| 2003/0210695 A1 | 11/2003 | Henrion | |
| 2004/0190526 A1 | 9/2004 | Kumar | |
| 2004/0190527 A1 | 9/2004 | Okura | |
| 2004/0240442 A1 | 12/2004 | Grimminger | |
| 2004/0264374 A1 | 12/2004 | Yu | |
| 2005/0002371 A1* | 1/2005 | Andersen ............ H04L 49/9042 370/346 |
| 2005/0018693 A1 | 1/2005 | Dull | |
| 2005/0157724 A1 | 7/2005 | Montuno | |
| 2005/0169270 A1 | 8/2005 | Mutou | |
| 2005/0181807 A1 | 8/2005 | Dowling | |
| 2005/0232272 A1 | 10/2005 | Deng | |
| 2006/0133298 A1 | 6/2006 | Ng | |
| 2006/0182035 A1 | 8/2006 | Vasseur | |
| 2006/0187817 A1 | 8/2006 | Charzinski | |
| 2006/0280192 A1 | 12/2006 | Desanti | |
| 2006/0291444 A1 | 12/2006 | Alvarez | |
| 2007/0115968 A1 | 5/2007 | Brown | |
| 2007/0127474 A1 | 6/2007 | Mirtorabi et al. | |
| 2007/0189291 A1 | 8/2007 | Tian | |
| 2008/0069125 A1 | 3/2008 | Reed | |
| 2008/0159285 A1 | 7/2008 | De Heer | |
| 2008/0165783 A1 | 7/2008 | Desanti | |
| 2008/0194240 A1 | 8/2008 | Dowling | |
| 2008/0212465 A1 | 9/2008 | Yan | |
| 2008/0240105 A1 | 10/2008 | Abdallah | |
| 2008/0316916 A1 | 12/2008 | Tazzari | |
| 2009/0067348 A1 | 3/2009 | Vasseur | |
| 2009/0185549 A1 | 7/2009 | Shon | |
| 2009/0196289 A1 | 8/2009 | Shankar | |
| 2009/0213735 A1 | 8/2009 | Check | |
| 2009/0219817 A1 | 9/2009 | Carley | |
| 2009/0225650 A1 | 9/2009 | Vasseur | |
| 2009/0310610 A1 | 12/2009 | Sandstrom | |
| 2010/0046400 A1 | 2/2010 | Wu | |
| 2010/0046515 A1* | 2/2010 | Wong .................... H04L 49/201 370/390 |
| 2010/0124225 A1 | 5/2010 | Fedyk | |
| 2010/0191911 A1 | 7/2010 | Heddes | |
| 2011/0149973 A1 | 6/2011 | Esteve Rothenberg | |
| 2011/0194557 A1* | 8/2011 | Baban .................... H04L 45/16 370/390 |
| 2011/0202761 A1 | 8/2011 | Sarela Mikko et al. | |
| 2011/0228770 A1 | 9/2011 | Dholakia | |
| 2011/0238816 A1 | 9/2011 | Vohra | |
| 2011/0274112 A1 | 11/2011 | Czaszar | |
| 2011/0299531 A1 | 12/2011 | Yu | |
| 2012/0075988 A1 | 3/2012 | Lu | |
| 2012/0099591 A1 | 4/2012 | Kotha | |
| 2012/0106560 A1 | 5/2012 | Gumaste | |
| 2012/0236857 A1 | 9/2012 | Manzella | |
| 2012/0243539 A1 | 9/2012 | Keesara | |
| 2013/0034097 A1 | 2/2013 | Dharmapurikar | |
| 2013/0051376 A1 | 2/2013 | Hatashita | |
| 2013/0100988 A1* | 4/2013 | Miyoshi ............. H04B 7/15528 375/211 |
| 2013/0107725 A1 | 5/2013 | Jeng | |
| 2013/0114595 A1 | 5/2013 | Mack-Crane | |
| 2013/0114619 A1 | 5/2013 | Wakumoto | |
| 2013/0136117 A1 | 5/2013 | Schrum, Jr. | |
| 2013/0136123 A1 | 5/2013 | Ge | |
| 2013/0170450 A1 | 7/2013 | Anchan | |
| 2013/0195001 A1 | 8/2013 | Liu | |
| 2013/0201988 A1 | 8/2013 | Zhou | |
| 2013/0308948 A1 | 11/2013 | Swinkels | |
| 2013/0329728 A1 | 12/2013 | Ramesh | |
| 2013/0336315 A1 | 12/2013 | Guichard | |
| 2013/0343384 A1 | 12/2013 | Shepherd | |
| 2014/0010074 A1 | 1/2014 | Ye | |
| 2014/0010223 A1 | 1/2014 | Wang | |
| 2014/0025821 A1* | 1/2014 | Baphna ............... H04L 61/2061 709/226 |
| 2014/0043964 A1 | 2/2014 | Gabriel | |
| 2014/0064081 A1 | 3/2014 | Morandin | |
| 2014/0098813 A1 | 4/2014 | Mishra | |
| 2014/0119191 A1 | 5/2014 | Onoue | |
| 2014/0126575 A1 | 5/2014 | Janneteau | |
| 2014/0160925 A1 | 6/2014 | Xu | |
| 2014/0189174 A1 | 7/2014 | Ajanovic | |
| 2014/0241357 A1* | 8/2014 | Liu ....................... H04L 45/745 370/392 |
| 2014/0301390 A1* | 10/2014 | Scott ....................... H04L 45/28 370/389 |
| 2014/0362846 A1 | 12/2014 | Li | |
| 2014/0369356 A1 | 12/2014 | Bryant | |
| 2015/0003458 A1 | 1/2015 | Li | |
| 2015/0009823 A1 | 1/2015 | Ganga | |
| 2015/0016469 A1 | 1/2015 | Ganichev | |

(56) References Cited

U.S. PATENT DOCUMENTS

| | | |
|---|---|---|
| 2015/0023328 A1 | 1/2015 | Thubert et al. |
| 2015/0049760 A1 | 2/2015 | Xu |
| 2015/0078377 A1 | 3/2015 | Wijnands et al. |
| 2015/0078378 A1 | 3/2015 | Wijnands et al. |
| 2015/0078379 A1 | 3/2015 | Wijnands et al. |
| 2015/0078380 A1 | 3/2015 | Wijnands et al. |
| 2015/0081941 A1 | 3/2015 | Brown |
| 2015/0085635 A1 | 3/2015 | Wijnands et al. |
| 2015/0092546 A1 | 4/2015 | Baratam |
| 2015/0131658 A1 | 5/2015 | Wijnands et al. |
| 2015/0131659 A1 | 5/2015 | Wijnands et al. |
| 2015/0131660 A1 | 5/2015 | Wijnands et al. |
| 2015/0138961 A1 | 5/2015 | Wijnands et al. |
| 2015/0139228 A1 | 5/2015 | Wijnands et al. |
| 2015/0172190 A1 | 6/2015 | Song |
| 2015/0181309 A1 | 6/2015 | Wijnands et al. |
| 2015/0249587 A1 | 9/2015 | Kozat |
| 2015/0319086 A1 | 11/2015 | Tripathi et al. |
| 2015/0334006 A1 | 11/2015 | Shao |
| 2016/0087890 A1 | 3/2016 | Przygienda |
| 2016/0119159 A1 | 4/2016 | Zhao |
| 2016/0127139 A1 | 5/2016 | Tian |
| 2016/0127142 A1 | 5/2016 | Tian et al. |
| 2016/0134518 A1 | 5/2016 | Callon et al. |
| 2016/0134535 A1 | 5/2016 | Callon |
| 2016/0142248 A1 | 5/2016 | Thubert et al. |
| 2016/0182353 A1 | 6/2016 | Garcia-Luna-Aceves |
| 2016/0191372 A1 | 6/2016 | Zhang |
| 2016/0205588 A1 | 7/2016 | Liu |
| 2016/0218961 A1 | 7/2016 | Lindem |
| 2016/0226725 A1 | 8/2016 | Iizuka |
| 2016/0254987 A1 | 9/2016 | Eckert et al. |
| 2016/0254988 A1 | 9/2016 | Eckert et al. |
| 2016/0254991 A1 | 9/2016 | Eckert et al. |
| 2016/0344616 A1 | 11/2016 | Roch |
| 2017/0012880 A1 | 1/2017 | Yang |
| 2017/0099232 A1 | 4/2017 | Shepherd |
| 2017/0126416 A1 | 5/2017 | McCormick |
| 2017/0142006 A1 | 5/2017 | Wijnands et al. |
| 2017/0302566 A1 | 10/2017 | Zhang |
| 2018/0083790 A1 | 3/2018 | Wijnands et al. |
| 2018/0091473 A1 | 3/2018 | Wijnands et al. |
| 2018/0102965 A1 | 4/2018 | Hari |
| 2018/0131532 A1 | 5/2018 | Wijnands et al. |
| 2018/0205565 A1 | 7/2018 | Wijnands et al. |
| 2018/0205636 A1 | 7/2018 | Hu |
| 2018/0278470 A1 | 9/2018 | Wijnands et al. |
| 2018/0287934 A1 | 10/2018 | Wang |
| 2018/0287935 A1 | 10/2018 | Wang |
| 2018/0309664 A1 | 10/2018 | Balasubramanian |
| 2018/0316520 A1 | 11/2018 | Wijnands et al. |
| 2019/0013964 A1 | 1/2019 | Wijnands |
| 2019/0014034 A1 | 1/2019 | Allan |
| 2019/0020574 A1 | 1/2019 | Eckert et al. |
| 2019/0058606 A1 | 2/2019 | Wijnands |
| 2019/0075041 A1 | 3/2019 | Wang |
| 2019/0116114 A1 | 4/2019 | Chen |
| 2019/0212176 A1 | 7/2019 | Wijnands et al. |

FOREIGN PATENT DOCUMENTS

| | | |
|---|---|---|
| CN | 101242413 | 8/2008 |
| CN | 101385275 | 3/2009 |
| CN | 101572667 | 11/2009 |
| CN | 101689172 | 3/2010 |
| CN | 102025538 | 4/2011 |
| CN | 102577238 | 7/2012 |
| WO | WO 2007/095331 | 8/2007 |

OTHER PUBLICATIONS

Wijnands, Isjbrand et al., "Bit Indexed Explicit Forwarding Optimization"; U.S. Appl. No. 16/525,649, filed Jul. 30, 2019; consisting of Specification, Claims, Abstract, and Drawings (49 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffsery—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc.;"IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Li, Tony et al., "IGP Requirements for Traffic Engineering With MPLS, draft-li-mpls-igp-te-00.txt," Network Working Group, Internet-Draft, Feb. 1999, pp. 1-6.

Microsoft, "IPv6 Addressing (TechRef)"; Apr. 3, 2011; https://technet.microsoft.com/en-us/library/dd392266(v=ws.10).aspx; pp. 1-30.

Moy, J., Ascend Communications, Inc., "OSPF Version 2," Network Working Group, Request for Comments 2328, Apr. 1998, pp. 1-244.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Psenak, P. et al., "OSPF Extensions for Segment Routing, draft-psenak-ospf-segment-routing-extension-05," Open Shortest Path First IGP, Internet-Draft, Jun. 2014, pp. 1-33.

(56) References Cited

OTHER PUBLICATIONS

Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.
Shen, N. et al., "Calculating Interior Gateway Protocol (IGP) Routes Over Traffic Engineering Tunnels," Network Working Group, Request for Comments 3906, Oct. 2004, pp. 1-8.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].
Wang, Xiaorong et al., "Multicast Traffic Steering Using Tree Identity in Bit Indexed Explicit Replication (BIER)," U.S. Appl. No. 16/557,065, filed Aug. 30, 2019; consisting of Specification, Claims, Abstract, and Drawings (96 pages).
Wijnands, Isjbrand et al., "Overlay Signaling for Bit Indexed Explicit Replication," U.S. Appl. No. 16/654,078, filed Oct. 16, 2019; consisting of Specification, Claims, Abstract, and Drawings (53 pages).
Wijnands, Ijsbrand et al., "Bit Indexed Explicit Replication," U.S. Appl. No. 16/669,653, filed Oct. 31, 2019; consisting of Specification, Claims, Abstract, and Drawings (49 pages).
Wijnands, Ijsbrand et al.; "Area-Specific Broadcasting Using Bit Indexed Explicit Replication"; U.S. Appl. No. 16/834,860, filed Mar. 30, 2020; consisting of Specification, Claims, Abstract, and Drawings (63 pages).
Wijnands, Ijsbrand et al.; "Unicast Media Replication Fabric Using Bit Indexed Explicit Replication"; U.S. Appl. No. 16/834,551, filed Mar. 30, 2020; consisting of Specification, Claims, Abstract, and Drawings (65 pages).
Wijnands, Ijsbrand et al., "Bridging of Non-Capable Subnetworks in a Bit Indexed Explicit Replication"; U.S. Appl. No. 16/777,945, filed Jan. 31, 2020; consisting of Specification, Claims, Abstract, and Drawings (69 pages).

* cited by examiner

Bit Indexed Routing Table A — 650

| Host ID | BP | Port |
|---|---|---|
| H1 | 2 | P2 |
| H2 | 3 | P3 |
| H3 | 4 | P3 |
| H4 | 1 | P3 |

Bit Indexed Routing Table B — 670

| Host ID | BP | Port |
|---|---|---|
| H1 | 2 | P2 |
| H2 | 3 | P4 |
| H3 | 4 | P3 |
| H4 | 1 | P3 |

| Bit Indexed Forwarding Table A | | |
|---|---|---|
| BP | BM | Port |
| 1 | 1101 | P3 |
| 2 | 0010 | P2 |
| 3 | 1101 | P3 |
| 4 | 1101 | P3 |

| Bit Indexed Forwarding Table B | | |
|---|---|---|
| BP | BM | Port |
| 1 | 1001 | P3 |
| 2 | 0010 | P2 |
| 3 | 0100 | P4 |
| 4 | 1001 | P3 |

*FIG. 7C*

BIT INDEXED EXPLICIT REPLICATION FOR LAYER 2 NETWORKING

RELATED APPLICATIONS

This application is a continuation of U.S. application Ser. No. 14/536,153, entitled "Bit Indexed Explicit Replication for Layer 2 Networking," filed Nov. 7, 2014, which is a continuation-in-part of U.S. application Ser. No. 14/488,790, U.S. application Ser. No. 14/488,761, and U.S. application Ser. No. 14/488,810, with further details of U.S. application Ser. Nos. 14/488,790; 14/488,761; and 14/488,810 being as follows: U.S. application Ser. No. 14/488,790 is entitled "Bit Indexed Explicit Replication Using Multiprotocol Label Switching," and was filed Sep. 17, 2014, and in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. U.S. application Ser. No. 14/488,761 is entitled "Bit Indexed Explicit Replication," and was filed Sep. 17, 2014, and in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. U.S. application Ser. No. 14/488,810, is entitled "Bit Indexed Explicit Replication Using Internet Protocol Version 6," and was filed Sep. 17, 2014, and in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the two provisional and four non-provisional applications referenced in this paragraph is hereby incorporated by reference in its entirety and for all purposes as if completely and fully set forth herein.

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. Multicast is the preferred method of data forwarding for many networks. One reason for this is that multicast is a bandwidth-conserving technology that reduces traffic by simultaneously delivering data to multiple receivers. However, some network environments are not well suited to support multicast. Doing so in such environments often involves discovering and maintaining significant amounts of control, or state, information. Setting up and maintaining this control information has a tendency to become complex and costly in terms of computing resources, and can become a major limiting factor in overall network performance. Another issue with multicast is that due to packet delivery mechanisms used, packets are sometimes forwarded to locations where the packets were not desired. This unnecessary delivery of packets represents an unwelcome burden on network performance overcoming this burden by traditional means involves generation and maintenance of even more control information.

BRIEF DESCRIPTION OF THE DRAWINGS

The present disclosure may be better understood, and its numerous objects, features, and advantages made apparent to those skilled in the art by referencing the accompanying drawings.

FIG. 6B is an example table generated by node of FIG. 3.

FIG. 6C is an example table generated by node of FIG. 3.

FIG. 7B is an example table generated by node of FIG. 3.

FIG. 7C is an example table generated by node of FIG. 3.

DETAILED DESCRIPTION

Overview

Figure 1:
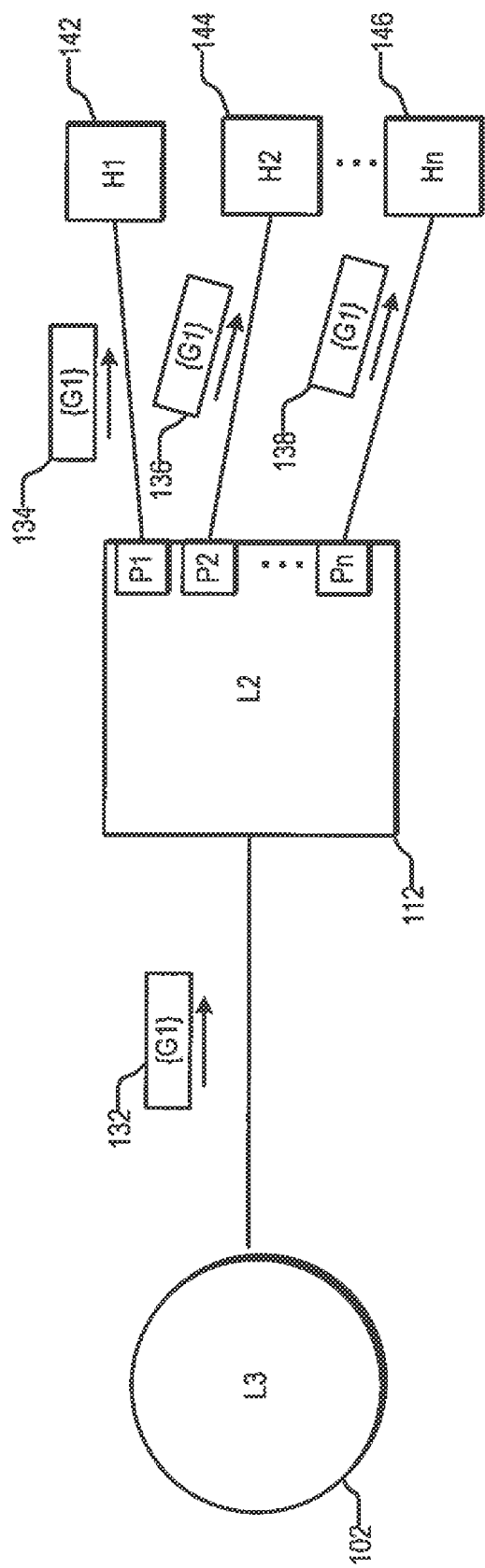
FIG. 1 is a simplified block diagram illustrating certain components of an example network.

Various systems and methods for performing bit indexed explicit replication (BIER). For example, one method involves receiving a link layer protocol frame at a network device. The link layer protocol frame includes a MAC address that identifies the link layer protocol frame as a being a multicast frame. The method then involves selecting a subset of ports included on the network device and forwarding the link layer protocol frame to only the selected subset of ports.

Layer 2 Multicast

Multicast delivers multicast data packets (data packets that traditionally include information identifying a multicast group, such as a multicast group address) from a source to multiple receivers without unduly burdening the source. As used herein, the term "source" signifies a network device that is identified (e.g., by registering as a source) as transmitting multicast data packets associated with a particular group or groups. As used herein, the term "receiver" signifies a host (such as a computing device or application) that has subscribed to a multicast group.

Multicast is traditionally implemented at layer 3 (the network layer) of the Open Systems Interconnection (OSI) model of networking. As implemented at layer 3, instead of a source replicating a multicast data packet and forwarding a separate copy of the multicast data packet to each receiver who has joined a given multicast group, the source forwards a single copy of the multicast data packet, and downstream multicast-enabled layer 3 devices, such as routers, replicate the multicast data packet at the point(s) where paths to various receivers diverge. Layer 3 multicast routing protocols are used to build multicast distribution trees from receivers towards sources. The multicast distribution trees are used in transmission of multicast data packets with replication close to the receivers of the multicast data packets. This saves network bandwidth and improves throughput.

Layer 2 networking protocols are less effective in implementing multicast than layer 3 networking protocols. Layer 3 domains typically include layer 3 devices, such as routers, while layer 2 domains typically include layer 2 devices, such as switches. The term "switch" is used herein to refer to any layer 2 networking device. Traditionally, when a multicast data packet is forwarded to a network device in a layer 2 domain, e.g., a switch, the switch floods the multicast data packet to all ports on the switch. This has the effect of flooding the multicast data packet to all switches in the layer 2 domain as well as all hosts connected to the switch. Flooding multicast data packets to all switches and all ports in the layer 2 domain results in the multicast data packets being forwarded to devices and hosts that have not requested the multicast data packets (e.g., have not joined multicast groups corresponding to the multicast data packets). Such unnecessary packet replication and forwarding is inefficient and represents a burden on network resources, such as processing, storage and transmission bandwidth.

One factor that contributes to inefficient handling of multicast data packets is that layer 2 does not fully support multicast group addresses. While some efforts have been made to translate layer 3 multicast group addresses into layer 2 multicast group addresses, the success of such efforts has been relatively limited. Furthermore, layer 2 does not support multicast distribution tree building, which is used in layer 3 to distribute multicast data packets to their intended destinations.

The term packet is commonly associated with layer 3 (network layer) communications. At layer 2 (link layer), packets are commonly referred to as frames. The term "packet," as used herein, should be understood to encompass both packets (in the layer 3 sense) and frames (in the layer 2 sense). The term "frame," as used herein, more specifically refers to a packet which has been encapsulated for layer 2 transmission (e.g., by including a layer 2 address with header information associated with the packet).

FIG. 1 shows an example network 100. Network 100 includes a layer 3 device 102 and a layer 2 network device 112. In one embodiment, 102 is implemented as a router, though any other computing device capable of using layer 3 network protocols, such as multiprotocol label switching (MPLS) and Internet protocol (IP), for packet transmission can be used. Layer 2 network device 112 can be implemented, for example, as a switch, though any other computing device capable of using layer 2 protocols, such as Ethernet, for packet transmission can be used. Router 102 is shown coupled to switch 112. As shown, switch 112 receives packets, such as packet 132, from router 102 and forwards the packets to one or more hosts 142-146 using layer 2 network protocols. Each of hosts 142-146 is a user device, such as a personal computer, or any other computing device capable of networked computing operations. Each of hosts 142-146 is shown coupled to a respective port P1-Pn, of switch 112. In one embodiment, ports P1-Pn are Ethernet ports. Multiple hosts can be coupled to a single port.

In the example of FIG. 1, packet 132 is a multicast data packet. That is, packet 132 includes information that identifies packet 132 as being a multicast data packet. In one embodiment, a MAC address is used to indicate that the packet is a multicast data packet. MAC addresses are typically 48-bit values used to forward packets at layer 2. In standard usage, bit 0 of the first byte of a MAC address is used to indicate whether the packet that includes the MAC address is a multicast data packet. If the bit is set to 1, the packet is a multicast data packet (or a broadcast packet). Setting bit 0 of the first byte of a MAC address included in packet 132 to 1 indicates that the packet is a multicast packet. Optionally, additional bits in the MAC address included in packet 132 can be used for multicast group address encoding. In response to receiving packet 132, and determining that bit 0 of the first byte of packet 132's MAC address is set to 1, switch 112 floods the packet to all of its ports. This results in copies 134-138 of packet 132 being forwarded to each host that is connected to switch 112.

One attempt to ameliorate unnecessary forwarding of packets at layer 2 is known as Internet group management protocol (IGMP) snooping. Generally, hosts signal their interest in joining or leaving a particular multicast group using an IGMP or multicast listener discovery (MLD). In the case of IGMP, a host sends an IGMP report to a layer 3 device, for example to a multicast control group or a membership group to which the layer 3 device listens. The IGMP report includes information (such as a multicast group address) identifying which multicast group is the subject of the IGMP report. The layer 3 device detects the IGMP report and determines whether the IGMP report is a join message indicating the host wishes to begin receiving multicast data packets associated with the multicast group or an unsubscribe message indicating the host wishes to cease receiving multicast data packets associated with the multicast group. In the case of a join message, the layer 3 device determines whether traffic associated with the multicast group is already forwarded to the switch from which the IGMP report was received. That is, if the layer 3 device has already received an IGMP report indicating that a host coupled to the switch wishes to join a given multicast group, the layer 3 device already forwards traffic for the multicast group to the switch. If the layer 3 device has not previously received an IGMP join from the layer 2 domain, the layer 3 device updates group membership information maintained by the layer 3 device to indicate that multicast data packets for the multicast group should be forwarded to the layer 2 domain, and begins forwarding traffic corresponding to the multicast group received at the layer 3 device to the switch. In the case of an unsubscribe message, the layer 3 device ensures (e.g., by updating the membership information) that layer 3 device will not forward subsequently received multicast data packets associated with the multicast group identified in the unsubscribe message to the switch.

IGMP snooping involves a switch detecting IGMP reports and determining, based on the IGMP reports, which (if any) multicast groups hosts connected to the switch wish to join. That is, a switch in the path between a host and an layer 3 device to which the host sends an IGMP report (or other membership message) can detect (snoop) the message. Using the limited multicast group addressing referred to above, the switch attempts to forward multicast data packets to the appropriate ports, e.g., ports to which hosts that have joined the multicast groups are connected. IGMP snooping involves a switch monitoring packets received from hosts connected to the switch's ports. If a switch detects that a packet being sent from a host includes multicast group membership information, e.g., if the packet includes an IGMP report, the switch parses the packet to determine which multicast group is identified by the IGMP report, and stores information associating the port from which the packet was received with the multicast group. For example, the switch updates a table that indicates which ports are subscribed to which multicast groups. The host then forwards subsequently received multicast data packets associated with those groups to the appropriate ports, rather than flooding the multicast data packets to all ports on the switch.

Figure 2:
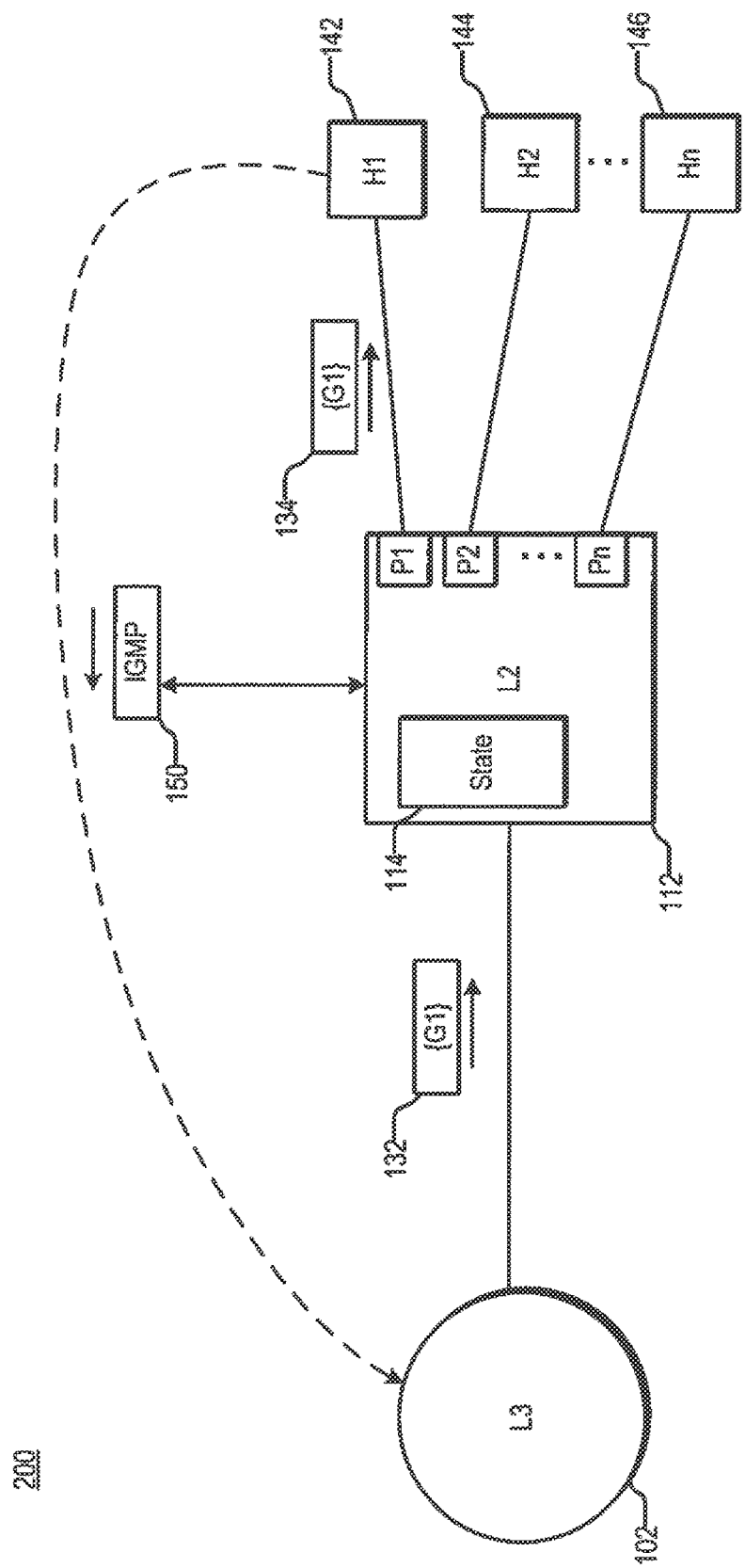
FIG. 2 is a simplified block diagram illustrating certain components of an example network.

FIG. 2 shows an example layer 2 network domain 200 in which IGMP snooping is implemented. FIG. 2 includes some components that are similar to corresponding components of network 100 of FIG. 1. Like components have like reference numerals.

The dashed line in FIG. 2 indicates that host 142 sends an IGMP report 150 to router 102. In one example, IGMP report 150 includes information indicating that host 142 wishes to join multicast group G1. Switch 112 monitors (snoops) traffic between host 142 and router 102. In response to detecting that the traffic includes IGMP report 150, switch 112 learns that host 142 wishes to subscribe to group G1. Switch 112 updates state information 114 with this information. State information 114 includes, for each multicast group, a list of which hosts are currently subscribed to the multicast group.

In response to receiving a packet, such as packet 132, from network device 102, switch 112 determines whether the packet is a multicast data packet, and if so, which multicast group address is included in the packet, e.g., encoded in the MAC address of the packet. Switch 112 then forwards a copy of packet 132 to only the host which has subscribed to the multicast group with which packet 132 is associated. In the example of FIG. 2, state information 114 indicates that only host 142 is subscribed to G1, so switch 112 forwards a copy 134 to only host 142, rather than flooding copies of the packet to all of the ports on switch 112.

While state information 114, as learned using IGMP snooping, may prevent some unnecessary flooding, IGMP snooping is not an ideal solution to implement multicast functionality at layer 2. One limitation of IGMP snooping is that IGMP snooping involves switch examining each packet sent from a host to determine whether the packet includes multicast group membership information, such as an IGMP report. Examining each packet received from each host is extremely wasteful, in terms of processing resources, and represents a significant burden on network performance. Furthermore, given the imperfect implementation of layer 2 multicast group addressing, the procedure is still subject to unreliable performance. For example, multicast group address collisions are unavoidable. Additionally, IGMP snooping involves the switch maintaining state information for each multicast group, including a list of which hosts are currently subscribed to each multicast group. The number of multicast groups can be quite large. As the number of multicast groups increases, the volume of state information maintained by the switch also increases. Since the amount of state information that can be maintained by a switch is limited by the amount of memory available for such state information, it may be problematic to maintain all the state information learned by performing IGMP snooping. Therefore, IGMP snooping provides limited effectiveness at a high cost. While it is desirable to reduce or eliminate the unnecessary flooding of multicast data packets, it is desirable to do so without incurring the performance costs and limited effectiveness associated with traditional mechanisms such as IGMP snooping.

Bit Indexed Explicit Replication

Techniques are described below that are used to effectively implement multicast at layer 2 without triggering the problems discussed above. The techniques involve attaching receiver information to packets in the form of bits and forwarding the packets based on the receiver information. This not only prevents flooding packets unnecessarily, but also greatly reduces the amount of state information stored at layer 2 switches and is therefore also referred to as "stateless multicast." More formally, the term Bit Indexed Explicit Replication (BIER) is used to describe these techniques. As suggested by the term, a bit position is used as an index into a forwarding table and packets are replicated only to specified ports associated with each of the bit positions. The present disclosure describes BIER in the context of layer 2. It should be understood that BIER is not limited to any particular network layer or routing protocol.

Figure 3:
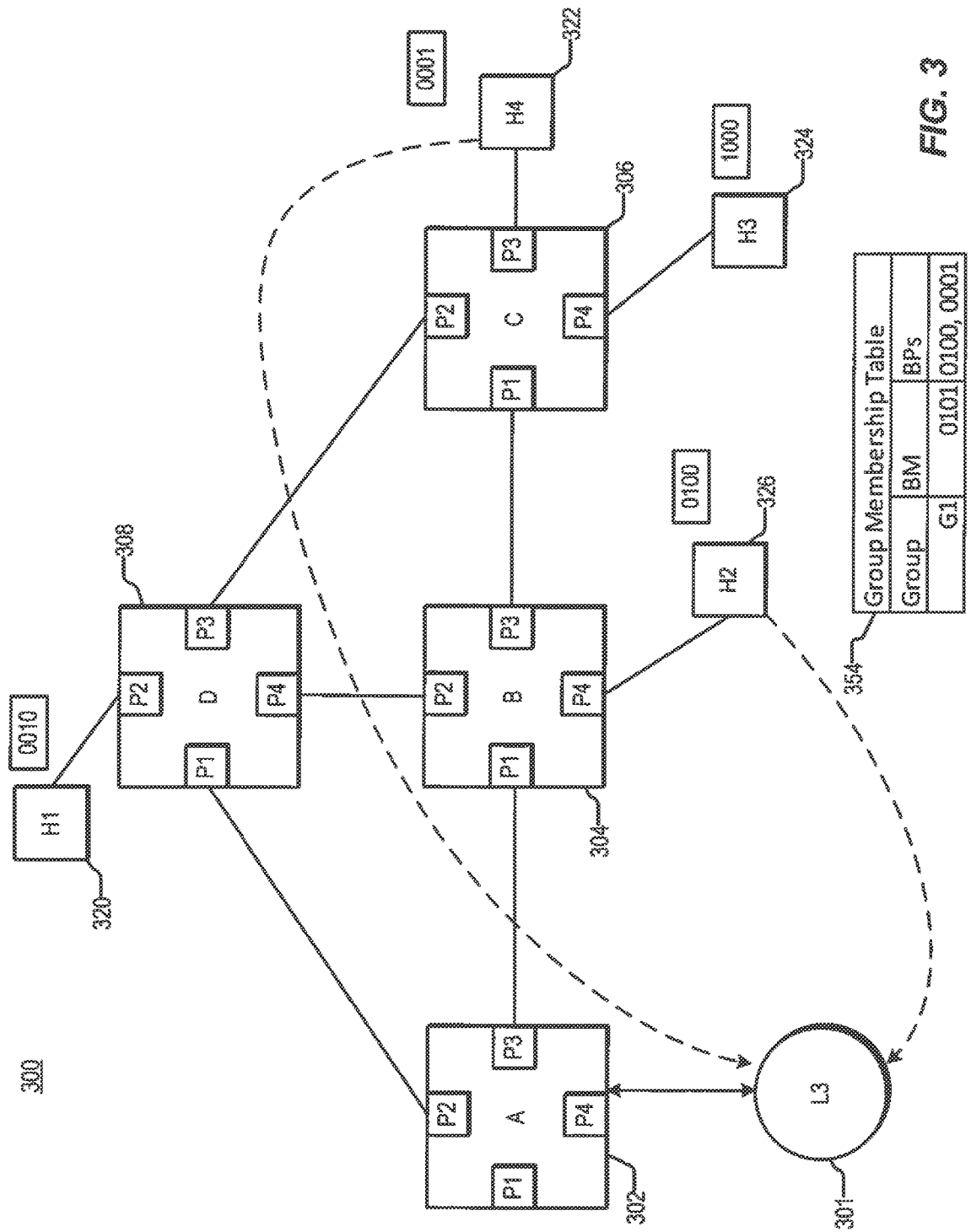
FIG. 3 is a simplified block diagram illustrating certain components of an example network.

FIG. 3 is a simplified block diagram illustrating certain components of an example network 300. Network 300 includes a plurality of nodes 302-308. In one embodiment, nodes 302-308 are implemented as BIER-enabled switches. BIER-enabled switches are configured to forward packets using BIER. BIER-enabled switches 302-308 form a layer 2 network, or domain. Each BIER-enabled switch includes a plurality of ports. As shown in the example of FIG. 3, each BIER-enabled switch includes four ports, P1, P2, P3, and P4. Switch 302 acts as an ingress switch for the layer 2 domain. Multicast data packets enter network 300 from one or more layer 3 network devices, such as layer 3 device 301, via switch 302. In one embodiment, layer 3 device 301 is implemented as a router, though any other computing device capable of implementing layer 3 protocols can be used.

Also shown in FIG. 3 are BIER-enabled hosts 320-326. Each BIER-enabled host is configured to participate in BIER. Each BIER-enabled host can be implemented as a personal computer, or other network capable device. Each of the BIER-enabled hosts is assigned a set identifier and bit position. In one embodiment, a dynamic host configuration protocol (DHCP) server (not shown) assigns set identifier and bit positions. In response to a BP being assigned to a host, the host advertises its BP, along with a uniquely identifying address, such as its MAC address, to some or all of the switches in the BIER network. In one embodiment, each BIER-enabled host incorporates information identifying the set identifier and bit position into a MAC address. The MAC address uniquely identifies the BIER-enabled host within the layer 2 domain and is discoverable by the switches in the layer 2 domain. The BIER-enabled host then transmits an address announcement to one or more other devices in the layer 2 domain using, for example, address resolution protocol (ARP) or neighbor discovery protocol (NDP).

Assigning a Bit Position in the Bit Mask

Each host in a layer 2 BIER network is assigned a unique bit position (BP) from a bit mask (BM). As used herein, the term bit mask refers to a set of bits that has a fixed or variable length. The length of the BM used in the BIER network can be statically configured or dynamically assigned and distributed through the BIER network. The BM can have any suitable length. In an embodiment, the length of the BM is determined in view of the size and capabilities of the network, and is between 8 and 4096 bits. The maximum length of the BM is determined, in one embodiment, by hardware or software limitations of the BIER-enabled elements (e.g., switches and hosts) in the BIER network. When included in a packet, the BM is sometimes referred to as a packet bit mask, a packet bit array, or as a bit string to differentiate the packet bit mask from a bit mask included in an entry in a table, such as a bit forwarding table.

In one embodiment, different BIER-enabled elements in the BIER network use different lengths for their respective BMs. For example, one BIER-enabled host may have a maximum BM length of 128 bits while another BIER-enabled host may have a maximum BM length of 256 bits. Various approaches to accommodate BIER networks where the number of BIER-enabled hosts exceeds the maximum number of bits in the BM are described below. A bit mask is one type of multicast forwarding entry in which each bit position of multiple bit positions is an element that can be used to represent an individual host. Other types of multicast forwarding entries with other types of values can be used. For example, an array of multi-bit entries, or any other multi-entry array in which each entry uniquely identifies a particular host, can be used.

A bit position (BP) assigned to a host is statically or dynamically assigned to the host. Each host should have at least one unique bit position from the BM. In one embodiment, a central authority, such as a controller, will assign the BPs to the hosts. Other mechanisms for assigning BPs can be implemented as well, such as deriving a BP from an address assigned to the host, or a network device to which the host is connected, where the derivation utilizes a mapping algorithm In some embodiments, a bit position in the BM is assigned to a single host. In other embodiments, a single BP can be assigned to more than one host. When multiple hosts are assigned the same BP, one of the multiple hosts can assume ownership of the BP at a given time, and ownership can be transferred between the multiple hosts. Ownership of the BP can be transferred to another one of the multiple hosts for any of several reasons, such as a failover in response to a node or link failure, or if one of the multiple hosts otherwise becomes unavailable, in response to changing network conditions, due to time-sharing considerations, and the like. Assigning one BP to multiple hosts facilitates operation similar to anycast, in which packets are forwarded to one receiver of a group of receivers, where each receiver in the group of receivers uses a common address.

As shown in the example of FIG. 3, network 300 utilizes a four bit BM. Each of the four hosts shown in network 300 is assigned a BP: host 320 is assigned BP {0010}; host 322 is assigned BP {0001}; host 324 is assigned BP {1000}; and host 326 is assigned BP {0100}. While this description refers to hosts being assigned BPs, BPs could also be assigned to interfaces, such as ports, on a switch, or to the switch itself.

Sets

The number of hosts that can be addressed (assigned a BP) is limited by the size of the BM included in the multicast data packet. The concept of sets allows an increase in the number of hosts that can be assigned BPs. The set identifier (SI) is, for example, a number between 0 and 255. The SI allows a BP to be unique in the context of a set. For example, each BP can be re-used in each set. In an embodiment with 256 sets and a BM length of 256 bits, 65536 (256×256) hosts can be supported. In one embodiment, BIER-enabled switches in the BIER network generate separate forwarding information for each SI. For example, if two different set identifiers are in use in the BIER network, the BIER-enabled switches each generate two bit forwarding tables (BFTs), one corresponding to each SI. In response to receiving a multicast data packet having a SI, a BIER-enabled switch uses the SI to select which forwarding information (e.g., BFT) to use to forward the multicast data packet.

In addition to extending the number of hosts that can be assigned unique BPs, sets can also be used in the context of multi-topology routing (MTR) or to enable temporal slicing. For example, a set of BPs can be assigned to a group of hosts. The ERs use the assigned BPs for a specified time period. A second set of BPs is also assigned to the hosts. The second set of BPs is used for a second time period. In an embodiment implemented in a dual plane network, the controller can assign one plane a first SI and the second plane a second SI. In one embodiment, BPs within a set are assigned to hosts based on geographic proximity to other hosts in the set.

A controller can determine that conditions exist to switch from forwarding packets using BPs in one set to another. For example, the controller can detect expiration of a specified time period, or receive a signal to switch between topologies in an MTR environment. In one embodiment, the controller centrally determines clustering of hosts within an aggregate collection of transported multicast flows and dynamically assigns and reassigns a SI and BP to all affected hosts. This enables a larger number of hosts to be addressed by a smaller BM. To switch sets, the controller indicates which SI and BM the IR should include in outgoing multicast data packets. Based on the SI, BIER-enabled nodes in the network will select a BFT associated with the SI, and forward multicast data packets accordingly.

In one embodiment, the SI is included as part of the BM encoding in a multicast data packet. There are a number of methods that can be used to implement sets that facilitate determining the SI from the packet. The methods vary based at least in part on the type of encapsulation used to carry the BM value. For example, in an Ethernet frame, a separate Ethertype could be allocated to designate a field to contain information identifying which set a particular BM is associated with. In one embodiment, if hosts that have signaled interest in a given multicast flow have different SIs, then the ingress switch sends a copy of the multicast data packet for each SI.

The above description makes clear that a BP can be unique in the context of a domain, or BIER network, or can be unique to a given set. In one embodiment, BPs are unique within the context of a particular logical or physical division of a given BIER network. For example, if a BIER network is divided into multiple VLANs, with each VLAN containing only a portion of the BIER-enabled hosts in the entire BIER network, assigning BPs to be unique in the context of a specific VLAN results in being able to use a smaller number of unique BPs.

Figure 4:
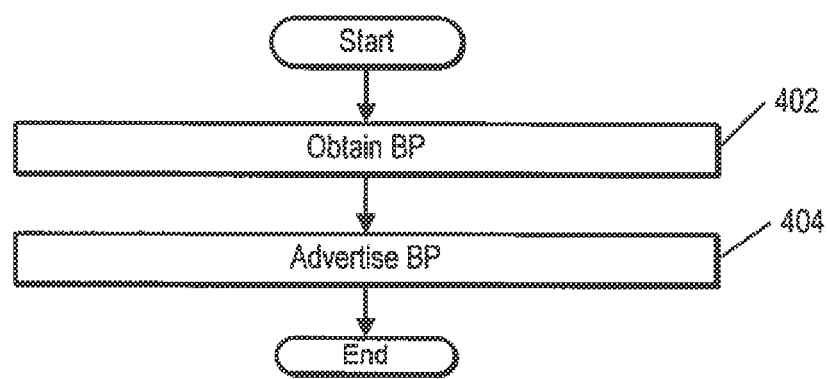
FIG. 4 is a flow chart illustrating an example process employed by a host of FIG. 3.

FIG. 4 shows an example method performed by a BIER-enabled host, such as one of BIER-enabled hosts 320-326 of FIG. 3. At 402, the host obtains a bit position and set identifier. In one embodiment, the BIER-enabled host requests the set identifier and bit position from a central controlling authority, such as a control node or network administrator. The BP can be received automatically in response to the BIER-enabled host joining the BIER network, or can be received in response to the BIER-enabled host signaling an intent to participate in BIER. In one embodiment, BPs are assigned according to an arbitrary sequence, and the controller determines the next available BP and assigns the next available BP to the BIER-enabled host. For example, the controller can assign BP 1 to the first BIER-enabled host to join the BIER network, BP 2 to the second BIER-enabled host to join the BIER network, and so on. In one embodiment, the BPs can be derived based on information specific to the BIER-enabled host using a mapping algorithm. For example, the BP can be based on the address of the switch to which the host is coupled.

In response to receiving its BP, the BIER-enabled host advertises the assigned BP at 404. In one embodiment, the BIER-enabled host broadcasts an ARP message to all layer 2 devices in the layer 2 domain. The BIER-enabled host can advertise additional information, such as its bit mask size, and the like. Any available mechanism for transmitting information between the BIER-enabled elements of the layer 2 domain can be used to advertise the BP.

BIER MAC Address

Figure 5:
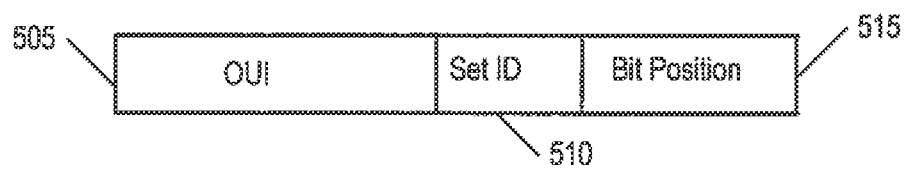
FIG. 5 is an example MAC address encoding.

FIG. 5 shows an example of a MAC address that can be used by a BIER-enabled host, such as one of BIER-enabled hosts 320-326 of FIG. 3, to perform forwarding using BIER. The MAC address includes, at 505, an organizationally unique identifier (OUI). In one embodiment, the OUI is a 24 bit value that is associated with BIER. That is, the OUI indicates that the MAC address that includes the OUI is being used to uniquely identify a BIER-enabled host within a layer 2 domain. The OUI further indicates that the MAC address includes information that identifies a set and a bit position associated with the BIER-enabled host.

The MAC address includes another 24 bits, which are divided between a set identifier 510 and a bit position 515. In one embodiment, the bit position is encoded, using 12 bits, as an integer value which identifies which bit in a larger bit mask is associated with the host. For example, if a BIER-enabled host is assigned a BP that is the 14$^{th}$ bit in a 256-bit BM, the BP can be represented in binary using 12 bits as the number 14 (e.g., 0000 0000 1110). Set ID 510 can similarly be implemented using a binary representation of the set ID associated with the BIER-enabled host.

BM Routing and Forwarding Tables

Each BIER-enabled switch in the BIER network uses the BPs and MAC addresses of the other BIER-enabled switches in a domain to generate one or more bit routing tables (BRTs) and bit forwarding tables (BFTs). A bit routing table is a table that stores BP-to-port mappings. Each BIER-enabled switch receives information indicating which MAC addresses are reachable via which of the BIER-enabled switch's ports and stores the information in a BRT. In one embodiment, the BRT includes one entry for each BP assigned to a BIER-enabled host in the domain. Example BRTs and BFTs are described in the context of FIG. 3.

Figure 6A:
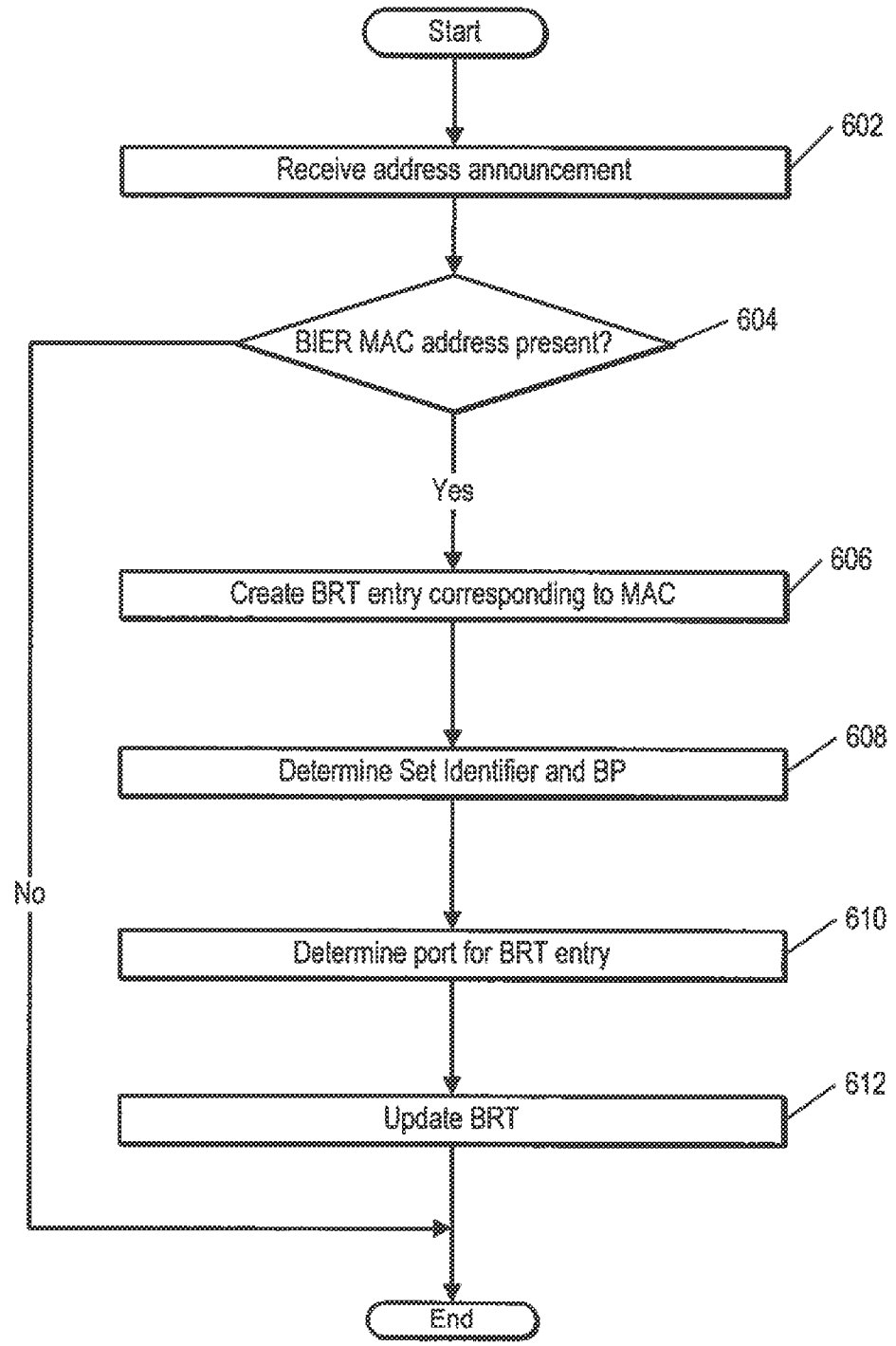
FIG. 6A is a flow chart illustrating an example process employed by a host of FIG. 3.

FIG. 6A is an example of constructing and updating a bit routing table. In one embodiment, the method shown in FIG. 6A is performed by a BIER-enabled switch, such as switch 304 of FIG. 3.

At 602, the switch receives information identifying a host, such as a MAC address. In one embodiment, the information includes an address announcement, for example using ARP. In one embodiment, the address announcement is received in response to an address query. An address query can be sent, for example, by a layer 3 device coupled to the layer 2 domain, another host in the layer 2 domain, or the switch. In another embodiment, the information is a data frame, and the source MAC field of the data frame is examined to discover a MAC address associated with the host from which the data frame was received. At 604, the switch determines whether the address announcement includes a BIER MAC address. In one embodiment, this involves examining an OUI included in the MAC address included in the address announcement to determine whether the OUI indicates that the MAC address is a BIER MAC address. In response to determining that the address announcement includes a BIER MAC address, the switch creates, at 606, an entry corresponding to the MAC address in a bit routing table.

At 608, the switch detects the value of the BP based on information included in the BIER MAC address. For example, the switch decodes a binary value included in a field of the MAC address (e.g., the 12 least significant bits) to detect which BP is indicated by the binary value. The switch also determines a value for a set identifier included in the MAC address. In one embodiment, this switch decodes a binary value included in a field of the MAC address (e.g., bits 13-24 of the MAC address) to detect which set identifier is indicated by the binary value. At 610, the switch determines the port via which the host corresponding to the MAC address in the address announcement is reachable. In one embodiment, this is the port via which the address announcement was received. In another embodiment, the switch looks up the MAC address in an address table maintained by the switch. The switch updates, at 612, the bit routing table. In one embodiment, this involves adding information identifying the BP corresponding to the MAC address associated with host that originated the address announcement and the port via which the host is reachable to the BRT entry that corresponds to the MAC address.

Using the example BIER network of FIG. 3, FIGS. 6B and 6C show BRTs constructed by BIER-enabled switches 302 and 304, respectively. As shown in FIG. 6B, BIER-enabled switch 302 constructs a bit routing table 650. Bit routing table 650 includes a column 652 that stores information identifying the BIER-enabled hosts from which address announcements including information identifying BPs were received. In one embodiment, the host IDs in column 652 are implemented as MAC addresses. BRT 650 includes, at 654, a column that stores information identifying bit positions associated with the BIER-enabled hosts identified in column 652. At 656, BRT 650 includes a column that stores information identifying ports via which the BIER-enabled hosts identified in column 652 are reachable. In the example of FIG. 3, BIER-enabled host H2 corresponds to BP 3 (e.g., the third bit is set as seen in {0100}). BIER-enabled host H2 is reachable from BIER-enabled switch 302 via port P3. Thus, in BRT 650, H2 is associated with BP 3 and P3.

FIG. 6C shows a bit routing table for BIER-enabled node 304. Bit routing table 670, similar to bit routing table 650, includes a column 672 that stores information identifying the BIER-enabled hosts from which address announcements were received. In one embodiment, the host ID is implemented as a MAC address. BRT 670 includes, at 674, a column that stores information identifying bit positions associated with the BIER-enabled hosts identified in column 672. At 676, BRT 670 includes a column that stores information identifying the ports via which the BIER-enabled hosts identified in column 672 are reachable. In the example of FIG. 3, BIER-enabled host H2 is reachable from BIER-enabled switch 304 via port P4. Thus, in BRT 670, H2 is associated with BP 3 and P4.

Each BIER-enabled node translates its BRT(s) into one or more bit forwarding tables (BFTs). Generating a BFT involves, in one embodiment, first sorting the BRT by neighbor. In one embodiment, the BRT entries are sorted by BP. For entries in the BRT that have a common port, the BPs of those entries are OR'd together, creating a collapsed BM entry.

Figure 7A:
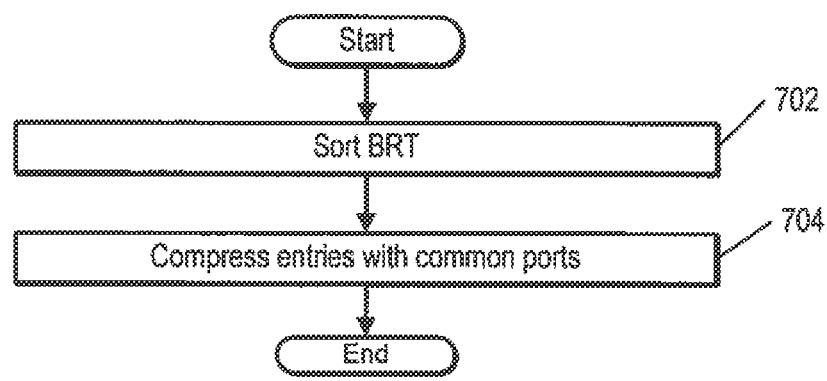
FIG. 7A is a flow chart illustrating an example process employed by a host of FIG. 3.

FIG. 7A shows an example of constructing and updating a bit forwarding table. In one embodiment, the method shown in FIG. 7A is performed by BIER-enabled switch, such as one of the BIER-enabled switches of FIG. 3. At 702, the BIER-enabled switch sorts the entries in a BRT. The entries are sorted, for example, by port or by BP.

At 704, the BIER-enabled switch generates a BM for each entry. Generating the BM involves setting a corresponding bit in the BM for each host that is reachable via the port identified in the entry. In one embodiment, the BIER-enabled switch performs an OR operation between the BMs that have a single bit set, the set bit corresponding to a BIER-enabled host reachable via the port.

FIG. 7B shows a bit forwarding table 730. In one embodiment, BFT 730 is created by BIER-enabled switch 302 of FIG. 3. BFT 730 includes a bit position column 732. Each bit position that has been assigned to a host has an entry. BFT also includes a BM column 734, which includes information identifying a bit mask which will be included in multicast data packets sent out from BIER-enabled switch 302, those multicast data packets being intended to reach the hosts corresponding to the bits indicated in bit position column 732. Port column 736 includes information identifying the ports via which the hosts that correspond to the BPs indicated in the BM column are reachable. In the example of FIG. 3, hosts H2, H3, and H4, which correspond to BPs 1, 3, and 4 (which corresponds to a BM with the $1^{st}$, $3^{rd}$, and $4^{th}$ bits set as seen here {1101}) are reachable via port P3. Thus, the first entry in BFT 730, which corresponds to BP 1 has a BM with bits set corresponding to each host reachable via the corresponding port (P3).

Similar to bit forwarding table 730 of FIG. 7B, bit forwarding table 740 of FIG. 7C includes information used by a BIER-enabled node to forward multicast data packets. In one embodiment, BFT 740 is created by BIER-enabled node 304 of FIG. 3. Bit forwarding table 740 includes a bit position column 742, a bit mask column 744, and a port column 746. In the example of FIG. 7C, in response to receiving a multicast data packet that includes a bit mask, a BIER-enabled switch determines how to forward the multicast data packet using BFT 740 and the BM in the multicast data packet. Since hosts corresponding to bit position 1 and bit position 4 are reachable via port P3, the corresponding BPs are aggregated to form BM 1001, which the BIER-enabled switch puts in the BFT entries corresponding to P3. The aggregation involves, in one embodiment, performing a logical OR operation between a BM that has only the BP corresponding to the respective host set. The host corresponding to bit position 3 is reachable via port P4. The corresponding bit is set in the BM of the BFT. The host corresponding to bit position 2 is reachable via port P2. The corresponding bit is set in the BM of the BFT.

Membership Information

A BIER-enabled host, such as BIER-enabled host 322 of FIG. 3, joins a multicast group by sending a signaling message (e.g., using IGMP or any other out-of-band signaling mechanism) to a BIER-enabled layer 3 device, or router coupled to the layer 2 domain to which the BIER-enabled host is coupled. The message includes information identifying the multicast group the BIER-enabled host wishes to join.

The BIER-enabled layer 3 device, such as BIER-enabled router 301 of FIG. 3, maintains state information that includes an entry for each multicast group that the BIER-enabled router receives multicast data packets for. In one embodiment, the BIER-enabled router maintains the state information in a group membership table (GMT), as shown at 354 of FIG. 3. In one embodiment, each entry includes information identifying a multicast group (such as the multicast group name and/or an address of a source for the multicast group), a list of BPs corresponding to BIER-enabled hosts that have expressed interest (e.g., via a signaling message) in the multicast group identified in the group field, and a BM, which identifies all of the BIER-enabled hosts that have expressed interest in the multicast group (e.g., by having a bit set in the bit position corresponding to each host that has expressed interest in the multicast group).

In response to receiving a signaling message from a BIER-enabled host indicating that the BIER-enabled host is interested in a multicast group, the BIER-enabled router sets the bit corresponding to the BIER-enabled host's BP in the BM that corresponds to the multicast group. When the BIER-enabled host is no longer interested in receiving multicast data packets for the multicast group, the BIER-enabled host signals to the BIER-enabled router, e.g., using an unsubscribe message, and the BIER-enabled router clears the corresponding bit in the BM.

The BIER-enabled network devices in the layer 2 domain forward multicast data packets through the layer 2 domain and to the BIER-enabled hosts based on the BM. The BIER-enabled router transmits the BM along with multicast data packets into the layer 2 domain. There are number of different techniques available for transmitting the BM. This description refers to encapsulating the BM into the multicast data packet. This terminology covers not only incorporating the BM into the multicast data packet (e.g., as header or payload information), but also appending or prepending some or all of the BM to the multicast data packet.

Figure 8A:
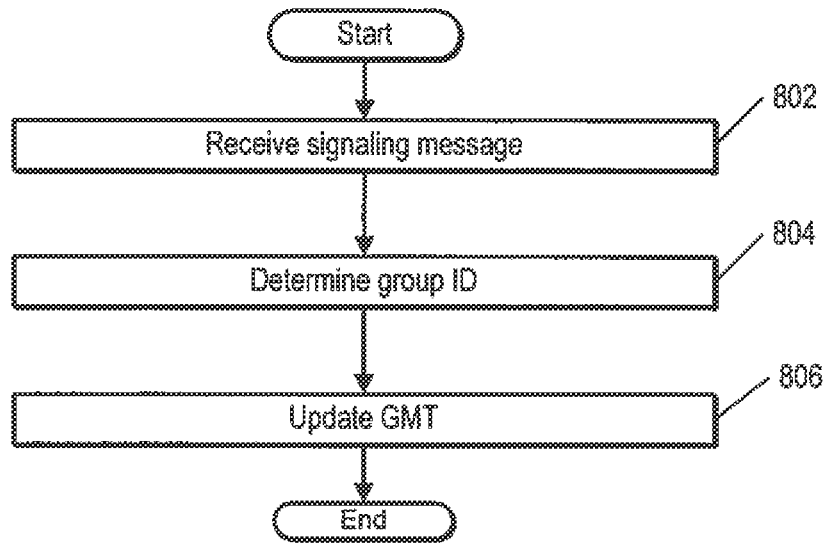
FIG. 8A is a flow chart illustrating an example process employed by a switch of FIG. 3.

FIG. 8A shows an example method performed by BIER-enabled router, such as BIER-enabled router 301 of FIG. 3. At 802, the BIER-enabled router receives a signaling message. In one embodiment, the signaling message is implemented as an IGMP report received from a BIER-enabled host, such as one of hosts 320-326 of FIG. 3.

At 804, the BIER-enabled router determines a multicast group ID from the signaling message. At 806, the BIER-enabled router updates a group membership table corresponding to the multicast group ID. Updating the GMT involves adding information identifying the BIER-enabled host that originated the signaling message, such as a set identifier and BP associated with the BIER-enabled host, to a list of information that identifies the BIER-enabled hosts that are subscribed to the multicast group identified by the signaling message. Alternatively, updating the GMT can involve removing information identifying the BIER-enabled host that originated the signaling message, for example if the message is an unsubscribe message. In one embodiment, the BIER-enabled router examines a source MAC address in the packet that included the signaling message to determine the BIER-enabled host that originated the signaling message. In one embodiment, the BIER-enabled router uses its BRT to determine the BP associated with the BIER-enabled host.

In the example of FIG. 3, as indicated by the dashed lines, BIER-enabled hosts 322 and 326 transmit signaling messages to BIER-enabled router 301 indicating their interest in joining multicast group G1. BIER-enabled router 301 updates GMT 354 to add information identifying the BPs associated with these BIER-enabled hosts to a BM for G1.

Bit Mask Encapsulation

Figure 8B:
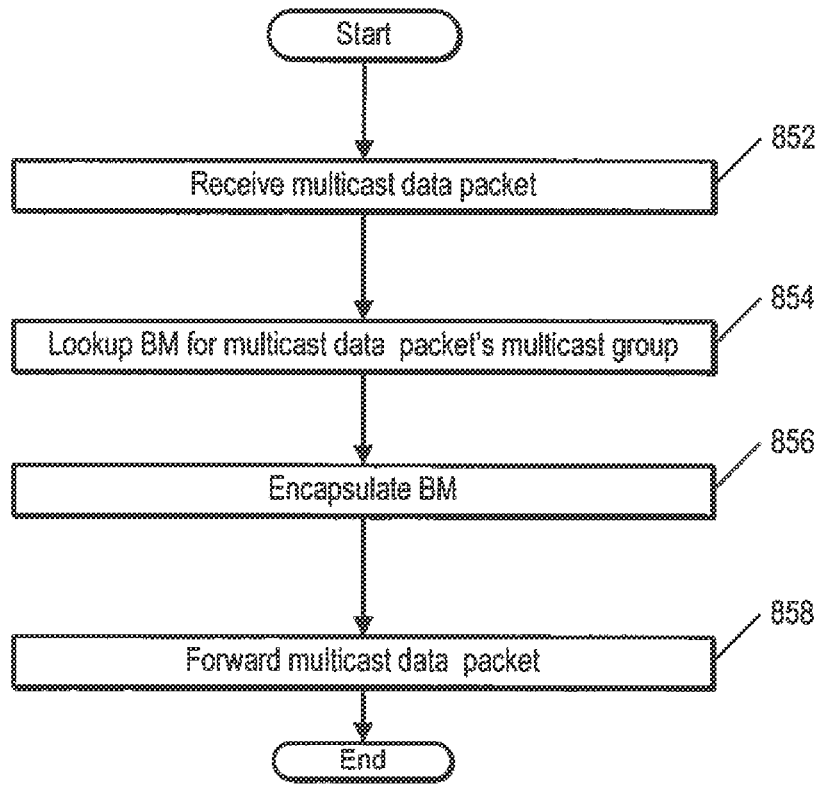
FIG. 8B is a flow chart illustrating an example process employed by a switch of FIG. 3.

FIG. 8B shows an example method performed by a BIER-enabled router, such as BIER-enabled router 301 of FIG. 3. At 852, the BIER-enabled router receives a multicast data packet. In one embodiment, the multicast data packet is received from a layer 3 device (not shown) to which the BIER-enabled router is coupled. In one embodiment, a destination address included in the multicast data packet identifies the multicast data packet as being a multicast data packet. For example, a IP destination address can include information identifying a multicast group, or a destination MAC address can include a multicast group address or translated IP multicast group address having a bit set in the bit position in the destination MAC address that indicates that the packet is to be forwarded using multicast.

At 854, the BIER-enabled router identifies the multicast group associated with the multicast data packet. In one embodiment, this involves examining the IP multicast group address included in the multicast data packet payload. Alternatively, the BIER-enabled router identifies the multicast group based on the destination MAC address of the multicast data packet. The BIER-enabled router then looks up a bit mask for the group. In one embodiment, this involves accessing a group membership table maintained by the BIER-enabled router.

At 856, the BIER-enabled router encapsulates the bit mask into the multicast data packet. In one embodiment, this involves incorporating and/or updating a destination MAC address, a source MAC address, a BIER tag, and a BM into the multicast data packet. Additional encapsulation details are discussed with regard to FIG. 9. At 858, the BIER-enabled router forwards the multicast data packet using the bit mask. Additional details regarding forwarding the multicast data packet in a layer 2 network are discussed with regard to FIG. 10. Using the example shown in FIG. 3, the BIER-enabled router 301 receives a multicast data packet for multicast group G1. BIER-enabled router 301 includes the BM for G1 {0101} in the multicast data packet before forwarding the multicast data packet using its BFT.

Figure 9:
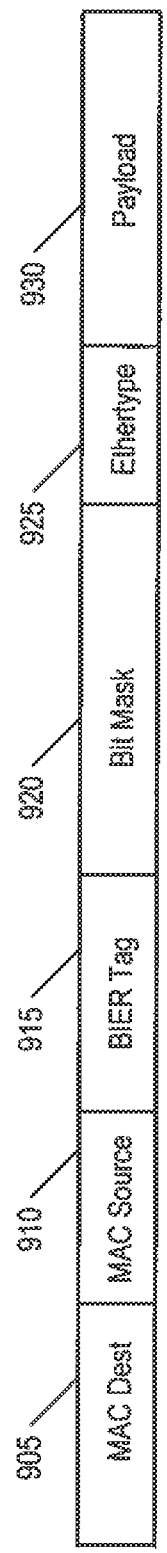
FIG. 9 is an example packet format.

FIG. 9 shows an example of a BIER multicast frame. At 905, the frame includes a MAC destination address, implemented as a 48-bit value. The value 01-00-5B-00-00-00 is a MAC address that indicates that the packet that includes the MAC address is a multicast data packet. At 910, the packet includes a MAC source address, which identifies the sender of the packet. At 915, the packet includes a BIER tag that indicates that the packet is a BIER packet that includes a bit mask. The bit mask is included in the packet at 920. As described above, the bit mask can be, for example, a 256 bit value where each bit is associated with a particular host. At 925, the packet includes an Ethertype value which indicates the protocol of the payload information that follows. At 930, the frame includes payload information.

Forwarding

Figure 10:
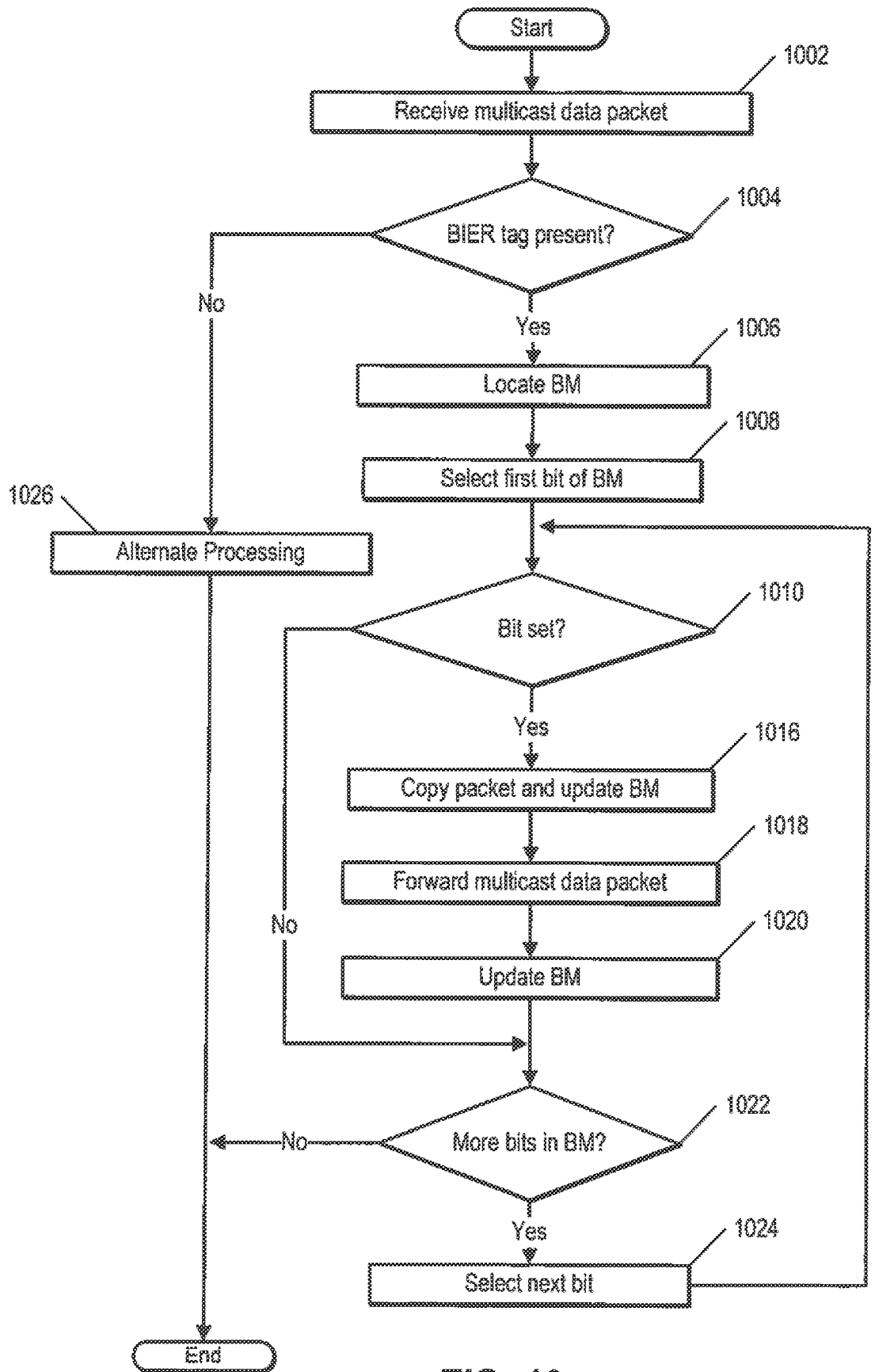
FIG. 10 is a flow chart illustrating an example process employed by a switch of FIG. 3.

FIG. 10 is a flow chart illustrating an example method of forwarding a packet using BIER. The method can be performed by a layer 2 device, such as one of BIER-enabled switches 302-308 of FIG. 3. At 1002, the BIER-enabled switch receives a multicast data packet. The BIER-enabled switch determines, at 1004, whether a BIER tag is present in the multicast data packet. If not, the BIER-enabled switch performs alternate processing at 1026. In one embodiment, alternate processing 1026 involves flooding the multicast data packet to all ports on the BIER-enabled switch.

If the multicast data packet does include a BIER tag, the BIER-enabled switch knows that the multicast data packet includes a bit mask. The BIER-enabled switch locates the bit mask in the multicast data packet at 1006. Using the bit-mask, the BIER-enabled switch determines which ports the packet should be forwarded to. In one embodiment, this involves determining, as shown at 1008, whether the first bit of the bit mask is set, as shown in 1010. If the bit is not set, the BIER-enabled switch determines, at 1022, whether more bits are present in the bit-mask. If so, the BIER-enabled switch selects the next bit at 1024 and the method return to 1010.

At 1010, the BIER-enabled switch determines whether the bit is set. In response to determining that a bit in the bit mask is set, the BIER-enabled switch forwards a copy of the packet to the port via which a host corresponding to the set bit is reachable. This involves, at 1016 creating a copy of the packet and updating the bit mask. In one embodiment, updating the bit mask in the copy of the packet involves clearing bits in the bit-mask which are not reachable via the port via which the copy of the packet is being forwarded. This can be accomplished by performing an AND operation between the bit mask from the incoming multicast data packet and the bit mask in the forwarding table entry that corresponds to the selected bit. The resulting value is used as the bit mask for the copy of the multicast data packet. At 1018, the BIER-enabled switch forwards the multicast packet to the port.

At 1020, the BIER-enabled switch updates the bit mask that arrived in the packet by clearing those bits in the multicast data packet's bit mask that correspond to the bits which were set in the multicast data packet that the BIER-enabled switch forwarded. In one embodiment, this involves performing an AND operation between the bit mask in the received multicast data packet, and the inverse of the bit mask in the entry corresponding to the selected bit. This has the effect of clearing those bits that correspond to bit positions which were set in the bit mask of the outgoing packet, which prevents looping and duplication. The BIER-enabled switch then determines, at 1022, whether more bits are present in the bit mask. The BIER-enabled switch then continues to walk to the bit mask of the received multicast data packet, bit-by-bit, until the end of the bit mask is reached.

Consider the following example, which illustrates the method described above of forwarding a multicast data packet. In this example, a multicast data packet arrives at BIER-enabled switch B (e.g., 304 of FIG. 3) having a bit mask of 0101, which corresponds, according to GMT 354 of FIG. 3, with multicast group G1. BIER-enabled switch B uses the BFT 740 shown in FIG. 7B.

In accordance with 1010 of FIG. 10, BIER-enabled switch B determines that the first bit of the bit mask (0101) is set. As indicated in bit forwarding table 740, the BIER-enabled host that corresponds to bit 1 is reachable via port P3. BIER-enabled switch B creates a copy of the multicast data packet. BIER-enabled switch B then updates the bit mask in the copy of the packet by performing a logical AND operation using the BM in the copy of the multicast data packet, which is 0101 and the bit mask in the entry corresponding to bit position 1, which is 1001. The result of the AND operation is 0001. BIER-enabled switch B updates the bit mask of the copy of the multicast data packet to 0001 and forwards the copy of the multicast data packet to port P3.

Next, BIER-enabled switch B updates the bit mask of the received multicast data packet by performing a logical AND operation between the bit mask of the received multicast data packet with the inverse of the entry used to forward the copy of the multicast data packet. The inverse of the BM in the entry used to forward the copy of the multicast data packet, which was 0001, is 1110. When 1110 is ANDed with the packet bit mask of the received multicast data packet (0101), the result is 0100. BIER-enabled switch B updates the bit mask of the received multicast data packet to be 0100.

In accordance with 1022 of FIG. 10, BIER-enabled switch B determines whether more bits are included in the bit mask of the received multicast data packet. Bit 2 is not set, but bit 3 is. As indicated in bit forwarding table 740, the BIER-enabled host that corresponds to bit 3 is reachable via port P4. BIER-enabled switch B creates a copy of the multicast data packet. BIER-enabled switch B then updates the bit mask in the copy of the packet by performing a logical AND operation using the BM in the copy of the multicast data packet, which is 0100 and the bit mask in the entry corresponding to bit position 3, which is 0100. The result of the AND operation is 0100. BIER-enabled switch B updates the bit mask of the copy of the multicast data packet to 0100 and forwards the copy of the multicast data packet to port P4.

Next, BIER-enabled switch B updates the bit mask of the received multicast data packet by performing a logical AND operation between the bit mask of the received multicast data packet with the inverse of the entry used to forward the copy of the multicast data packet. The inverse of the BM in the entry used to forward the copy of the multicast data packet, which was 0100, is 1011. When 1011 is ANDed with the packet bit mask of the received multicast data packet (0100), the result is 0000. BIER-enabled switch B updates the bit mask of the received multicast data packet to be 0000.

In accordance with 1022 of FIG. 10, BIER-enabled switch B determines whether more bits are included in the bit mask of the received multicast data packet. There are, but since none of the bits are set (the bit mask was updated to 0000), the method ends, as far as BIER-enabled switch B is concerned.

Figure 11:
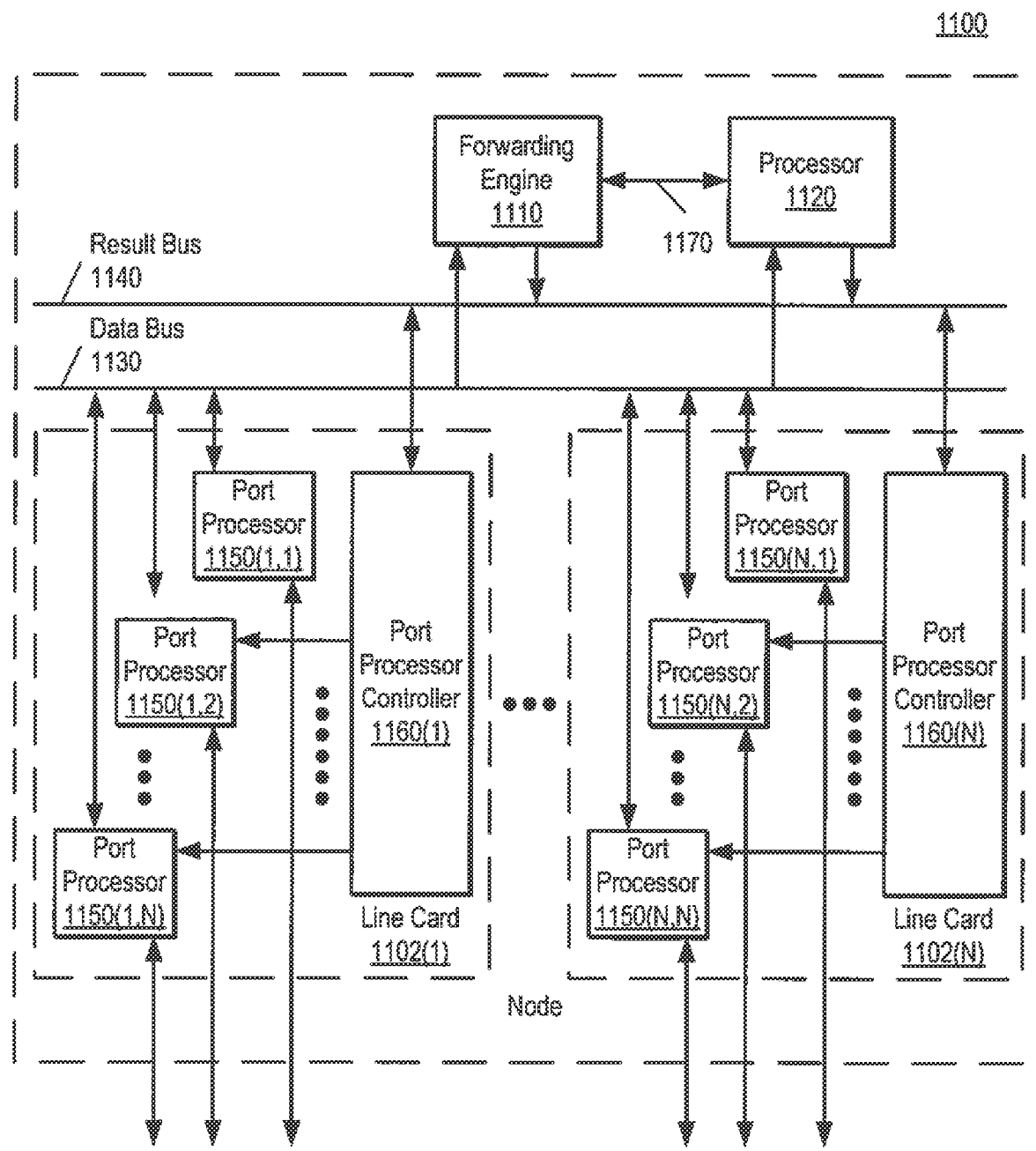
FIG. 11 is a block diagram illustrating certain components of an example node that can be employed in the network of FIG. 3.

FIG. 11 is a block diagram illustrating certain additional and/or alternative components of nodes that can be employed, for example in the network shown in FIG. 3. In this depiction, node 1100 includes a number of line cards (line cards 1102(1)-(N)) that are communicatively coupled to a forwarding engine or packet forwarder 1110 and a processor 1120 via a data bus 1130 and a result bus 1140. Line cards 1102(1)-(N) include a number of port processors 1150(1,1)-(N,N) which are controlled by port processor controllers 1160(1)-(N). It will also be noted that forwarding engine 1110 and processor 1120 are not only coupled to one another via data bus 1130 and result bus 1140, but are also communicatively coupled to one another by a communications link 1170.

The processors 1150 and 1160 of each line card 1102 may be mounted on a single printed circuit board. When a packet or packet and header are received, the packet or packet and header may be identified and analyzed by router 1100 in the following manner upon receipt, a packet (or some or all of its control information) or packet and header is sent from the one of port processors 1150(1,1)-(N,N) at which the packet or packet and header was received to one or more of those devices coupled to data bus 1130 (e.g., others of port processors 650(1,1)-(N,N), forwarding engine 1110 and/or processor 1120). Handling of the packet or packet and header can be determined, for example, by forwarding engine 1110. For example, forwarding engine 1110 may determine that the packet or packet and header should be forwarded to one or more of port processors 1150(1,1)-(N, N). This can be accomplished by indicating to corresponding one(s) of port processor controllers 1160(1)-(N) that the copy of the packet or packet and header held in the given one(s) of port processors 1150(1,1)-(N,N) should be forwarded to the appropriate one of port processors 1150(1,1)-(N,N). In addition, or alternatively, once a packet or packet and header has been identified for processing, forwarding engine 1110, processor 1120 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 12:
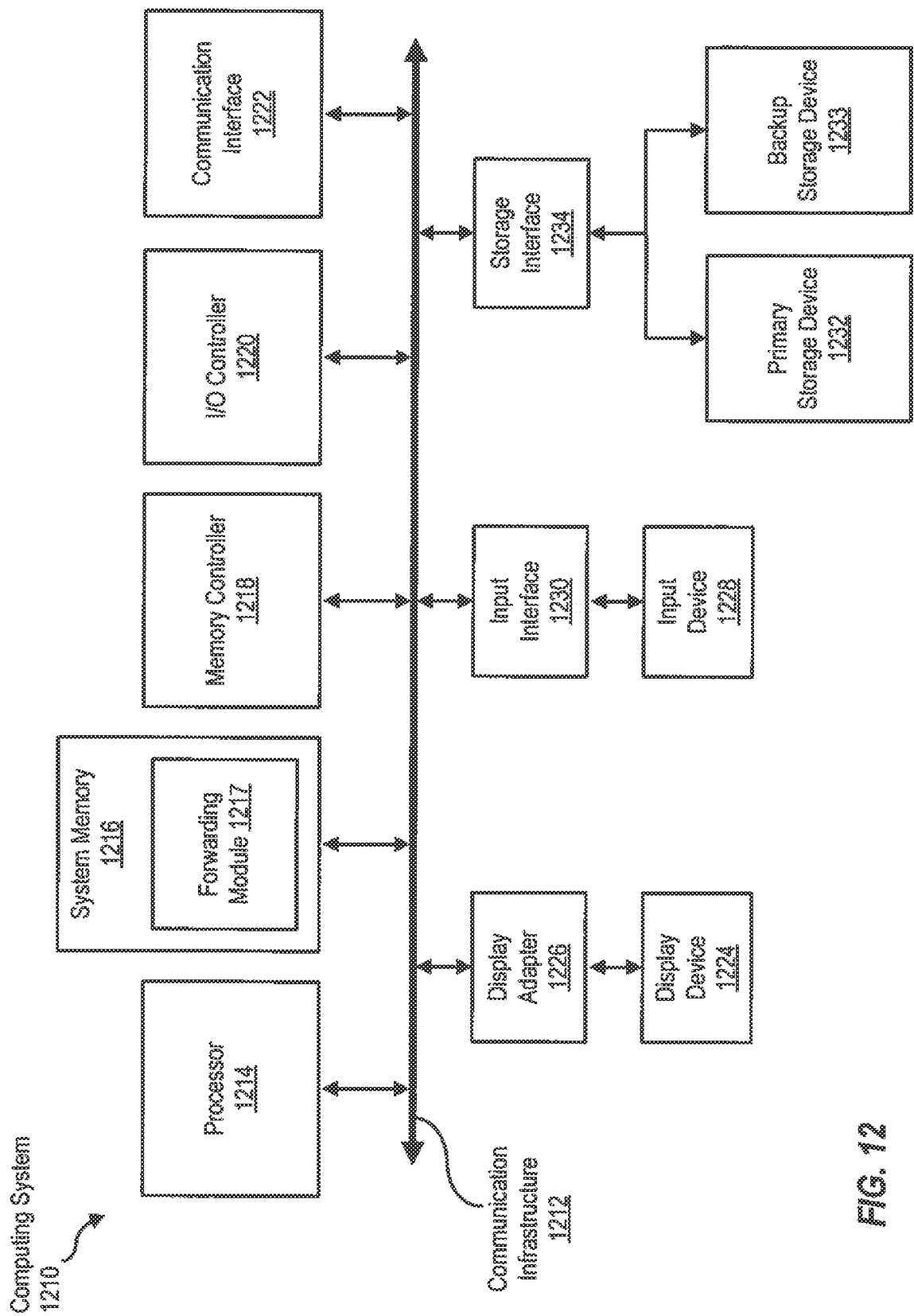
FIG. 12 is a block diagram depicting a computer system suitable for implementing embodiments of the systems described herein.

FIG. 12 is a block diagram of a computing device, illustrating how a forwarding module can be implemented in software, as described above. Computing system 1210 broadly represents any single or multi-processor computing device or system capable of executing computer-readable instructions. Examples of computing system 1210 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1210 may include at least one processor 1214 and a system memory 1216. By executing the software that implements a forwarding module 1212, computing system 1210 becomes a special purpose computing device that is configured to perform packet forwarding, in the manner described above.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the embodiments described and/or illustrated herein. For example, processor 1214 may perform and/or be a means for performing the operations described herein. Processor 1214 may also perform and/or be a means for performing any other operations, methods, or processes described and/or illustrated herein.

System memory 1216 generally represents any type or form of volatile or non-volatile storage device or medium capable of storing data and/or other computer-readable instructions. Examples of system memory 1216 include, without limitation, random access memory (RAM), read only memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, program instructions executable to implement a forwarding module configured to forward multicast data packets may be loaded into system memory 1216.

In certain embodiments, computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1214 generally represents any type or form of infrastructure capable of facilitating communication between one or more components of a computing device. Examples of communication infrastructure 1214 include, without limitation, a communication bus (such as an Industry Standard Architecture (ISA), Peripheral Component Interconnect (PCI), PCI express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1214. In certain embodiments, memory controller 1218 may perform and/or be a means for performing, either alone or in combination with other elements, one or more of the operations or features described and/or illustrated herein.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 1214 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1214 (or from a frame buffer) for display on display device 1224.

As illustrated in FIG. 12, computing system 1210 may also include at least one input device 1228 coupled to communication infrastructure 1214 via an input interface 1230. Input device 1228 generally represents any type or form of input device capable of providing input, either computer or human generated, to computing system 1210. Examples of input device 1228 include, without limitation, a keyboard, a pointing device, a speech recognition device, or any other input device.

As illustrated in FIG. 12, computing system 1210 may also include a primary storage device 1232 and a backup storage device 1233 coupled to communication infrastructure 1214 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210. A storage device like primary storage device 1232 can store information such as routing tables and forwarding tables.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12.

Computing system 1210 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1210 for storage in memory via a network such as the Internet or upon a carrier medium.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1210 may be configured as an application specific integrated circuit (ASIC) adapted to implement one or more of the embodiments disclosed herein.

Figure 13:
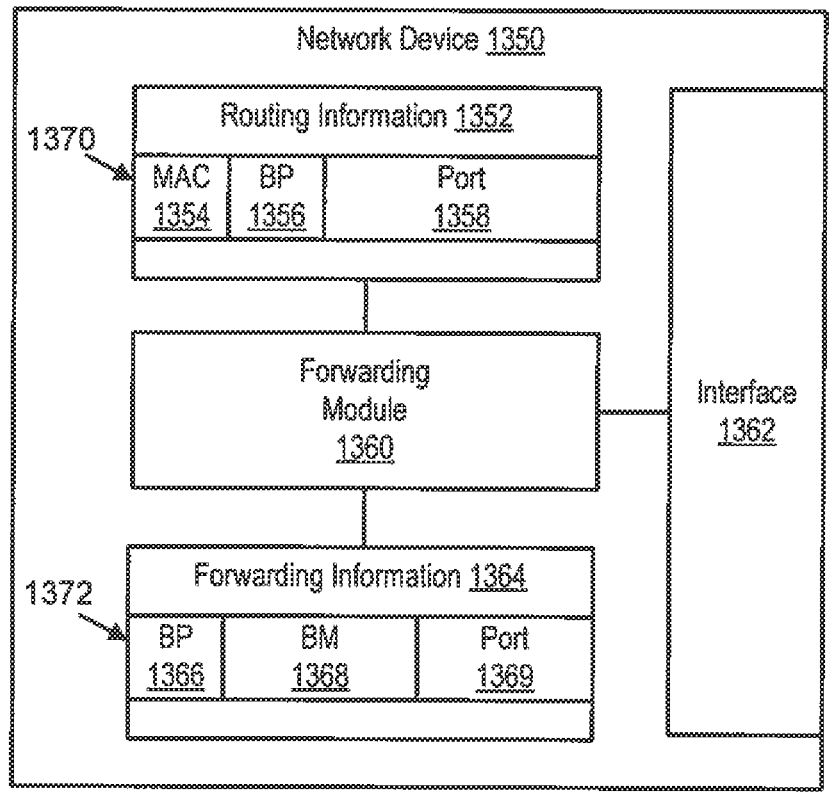
FIG. 13 is a block diagram depicting a network device suitable for implementing embodiments of the systems described herein.

A block diagram of an exemplary network device that may be associated with a node in network 300 of FIG. 3 is shown in FIG. 13. Network device 1350 of FIG. 13 may, for example, be associated with BIER-enabled switch 302 in FIG. 3. In some cases "node" as used herein encompasses one or more network devices associated with the node. "Network devices" as used herein includes various devices, such as routers, switches, or network controllers, that perform routing and/or forwarding functions and support one or more routing and/or switching protocols. A network device maintains one or more routing and/or forwarding tables that store routing and/or forwarding information identifying paths to various data sources and/or data consumers. In, for example, a multicast-enabled node, a network device implements a multicast routing protocol that is used to convey multicast data packets from a multicast source to a multicast receiver. For each multicast group to which a multicast source sends data, the multicast routing protocol can establish a multicast distribution tree, which is a group of coupled nodes that can convey packets from the multicast source to the multicast receivers.

In the embodiment of FIG. 13, network device 1350 includes storage for routing information 1352, storage for forwarding information 1364, a forwarding module 1360, and an interface 1362. Interface 1362 is coupled to send and receive packets. It is noted that network device 1350 may include additional interfaces, and that each interface can be a logical or physical interface. In one embodiment, interface 1362 includes one or more ports.

Forwarding module 1360 is configured to perform forwarding based on the stored forwarding information 1364. Forwarding module 1360 is also configured to update the stored routing information 1352 and forwarding information 1364. Forwarding module 1360 can implement one or more instances of a layer 2 forwarding protocol.

Entry 1370 provides an example of routing information stored in memory of a network device. As shown, entry 1370 includes a MAC address 1354, information 1356 identifying a bit position (BP), and information 1358 identifying a port. The MAC address and BP identify a host with entry 1370 is associated, and the port information identifies to which port within interface 1362 packets addressed to the host are properly forwarded. The storage for routing information 1352 is, in one embodiment, implemented as a bit indexed routing table, or bit routing table (BRT).

Entry 1372 provides an example of forwarding information that can be stored in memory of a network device. As shown, entry 1372 includes information 1366 identifying a BP, a bit mask or bit array 1368, and information 1369 identifying a port. Forwarding module 1360 uses the information in entry 1372 to forward to the port identified in the entry. For example, when a packet is received, the forwarding engine accesses entry 1372 and determines, using the BM, which port(s) the packet should be forwarded to. The storage for forwarding information 1364 is, in one embodiment, implemented as a bit indexed forwarding table, or bit forwarding table (BFT).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving information from a host;
   determining whether the information comprises a bit-indexed explicit replication ("BIER") MAC address, wherein
      the BIER MAC address comprises bit position information that identifies a bit position associated with the host, wherein
         the bit position information can be used to update a bit routing table that stores bit position-to-port mappings;
   in response to determining that the information comprises a BIER MAC address, storing routing information pertaining to the BIER MAC address in the bit routing table wherein
      the routing information comprises
         a bit position that is associated with the host, and
         a port via which the host is reachable;
   creating a bit forwarding table, wherein
      the bit forwarding table is created, at least in part, by sorting the bit routing table; and
   subsequent to receiving a multicast data packet that comprises a bit mask, forwarding the multicast data packet to a second host, wherein
      the forwarding is performed, at least in part, by using the bit forwarding table and the bit mask.

2. The method of claim 1, wherein
   the information received from the host is an address announcement, and
   the address announcement is received in response to an address query.

3. The method of claim 2, wherein
   the address announcement was sent by one of:
      a Layer 3 device coupled to the Layer 2 domain,
      a second host in the Layer 2 domain, or
      a switch.

4. The method of claim 1, wherein
   the information comprises a data frame; and
   the method further comprises
      examining a source MAC field of the data frame to determine a MAC address that is associated with the host.

5. The method of claim 1, wherein
the determining comprises examining an organizationally unique identifier (OUI), wherein
the OUI indicates that the BIER MAC address uniquely identifies a BIER-enabled host within a Layer 2 domain, and
the OUI further indicates that the BIER MAC address comprises information identifying a set and a bit position associated with the BIER-enabled host.

6. The method of claim 1, wherein
the information further comprises a set identifier,
the set identifier uniquely identifies a set of bit positions associated with a set plurality of hosts, and
the bit position uniquely identifies the host within the set plurality of hosts associated with the set of bit positions.

7. The method of claim 1, wherein
the BIER MAC address comprises a binary value, and
the bit position that is associated with the host is determined, at least in part, by decoding the binary value.

8. The method of claim 1, wherein
the port is determined based on at least one of:
 detecting that the information was received via the port, or
 querying an address table to determine the port associated with the BIER MAC address.

9. A networking device comprising:
a microprocessor, and
a non-transitory computer readable storage medium, wherein
 the non-transient computer readable storage medium comprises program instructions executable to perform a method comprising:
receiving information from a host;
determining whether the information comprises a MAC address that is a bit-indexed explicit replication ("BIER") MAC address, wherein
 the BIER MAC address comprises bit position information that identifies a bit position associated with the host, wherein
  the bit position information can be used to update a bit routing table that stores bit position-to-port mappings;
in response to determining that the information comprises a BIER MAC address, storing routing information pertaining to the BIER MAC address in the bit routing table wherein
 the routing information comprises
  a bit position that is associated with the host, and
  a port via which the host is reachable;
creating a bit forwarding table, wherein
 the bit forwarding table is created, at least in part, by sorting the bit routing table; and
subsequent to receiving a multicast data packet that comprises a bit mask, forwarding the multicast data packet to a second host, wherein
 the forwarding is performed, at least in part, by using the bit forwarding table and the bit mask.

10. The networking device of claim 9, wherein
the information received from the host is an address announcement,
the address announcement is received in response to an address query, and
the address announcement was sent by one of:
 a Layer 3 device coupled to the Layer 2 domain,
 a second host in the Layer 2 domain, or
 a switch.

11. The networking device of claim 9, wherein
the information comprises a data frame; and
the method further comprises
 examining a source MAC field of the data frame to determine a MAC address that is associated with the host.

12. The networking device of claim 9, wherein
the determining comprises examining an organizationally unique identifier (OUI), wherein
 the OUI indicates that the BIER MAC address uniquely identifies a BIER-enabled host within a Layer 2 domain, and
 the OUI further indicates that the BIER MAC address comprises information identifying a set and a bit position associated with the BIER-enabled host.

13. The networking device of claim 9, wherein
the information further comprises a set identifier,
the set identifier uniquely identifies a set of bit positions associated with a set plurality of hosts,
the bit position uniquely identifies the host within the plurality of hosts associated with the set of bit positions,
the BIER MAC address comprises a binary value, and
the bit position that is associated with the host is determined, at least in part, by decoding the binary value.

14. The networking device of claim 9, wherein
the port is determined based on at least one of:
 detecting that the information was received via the port, or
 querying an address table to determine the port associated with the BIER MAC address.

15. A system comprising:
a microprocessor, and
a non-transitory computer readable storage medium, wherein
 the non-transient computer readable storage medium comprises program instructions executable to perform a method comprising:
receiving information from a host;
determining whether the information comprises a MAC address that is a bit-indexed explicit replication ("BIER") MAC address, wherein
 the BIER MAC address comprises bit position information that identifies a bit position associated with the host, wherein
  the bit position information can be used to update a bit routing table that stores bit position-to-port mappings;
in response to determining that the information comprises a BIER MAC address, storing routing information pertaining to the BIER MAC address in the bit routing table wherein
 the routing information comprises
  a bit position that is associated with the host, and
  a port via which the host is reachable;
creating a bit forwarding table, wherein
 the bit forwarding table is created, at least in part, by sorting the bit routing table; and
subsequent to receiving a multicast data packet that comprises a bit mask, forwarding the multicast data packet to a second host, wherein
the forwarding is performed, at least in part, by using the bit forwarding table and the bit mask.

16. The system of claim 15, wherein
the information received from the host is an address announcement, the address announcement is received in response to an address query, and the address announcement was sent by one of:
- a Layer 3 device coupled to the Layer 2 domain,
- a second host in the Layer 2 domain, or
- a switch.

17. The system of claim 15, wherein the information comprises a data frame; and the method further comprises
- examining a source MAC field of the data frame to determine a MAC address that is associated with the host.

18. The system of claim 15, wherein the determining comprises examining an organizationally unique identifier (OUI), wherein
- the OUI indicates that the BIER MAC address uniquely identifies a BIER-enabled host within a Layer 2 domain, and
- the OUI further indicates that the BIER MAC address comprises information identifying a set and a bit position associated with the BIER-enabled host.

19. The system of claim 15, wherein the information further comprises a set identifier, the set identifier uniquely identifies a set of bit positions associated with a plurality of hosts, the bit position uniquely identifies the host within the plurality of hosts associated with the set of bit positions, the BIER MAC address comprises a binary value, and the bit position that is associated with the host is determined, at least in part, by decoding the binary value.

20. The system of claim 15, wherein the port is determined based on at least one of:
- detecting that the information was received via the port, or
- querying an address table to determine the port associated with the BIER MAC address.

* * * * *